United States Patent [19]

McNabb et al.

[11] Patent Number: 5,884,224
[45] Date of Patent: Mar. 16, 1999

[54] MOBILE MOUNTED REMOTE SENSING/ APPLICATION APPARATUS FOR INTERACTING WITH SELECTED AREAS OF INTEREST WITHIN A FIELD

[75] Inventors: Gerald J. McNabb; Byron Smith, both of Pocatello, Id.

[73] Assignee: J.R. Simplot Company, Pocatello, Id.

[21] Appl. No.: 813,180

[22] Filed: Mar. 7, 1997

[51] Int. Cl.[6] ................................................. G06F 19/00
[52] U.S. Cl. ......................................... 702/2; 364/528.19
[58] Field of Search ....................... 702/2, 3, 5; 706/930, 706/931; 137/78.3, 78.2; 364/528.18, 528.19; 56/10.2 A, 10.2 B

[56] References Cited

U.S. PATENT DOCUMENTS

| | | | |
|---|---|---|---|
| Re. 31,023 | 9/1982 | Hall, III | 47/1 R |
| 4,015,366 | 4/1977 | Hall, III | 47/1 R |
| 4,186,880 | 2/1980 | Jacobi et al. | 239/177 |
| 4,220,998 | 9/1980 | Kays | 364/528.18 |
| 4,249,698 | 2/1981 | Smith et al. | 239/1 |
| 4,569,481 | 2/1986 | Davis et al. | 239/177.2 |
| 4,626,984 | 4/1987 | Unruh et al. | 364/528.19 |
| 4,755,942 | 7/1988 | Gardner et al. | 364/528.19 |
| 4,777,785 | 10/1988 | Rafaels | 364/528.19 |
| 4,852,802 | 8/1989 | Iggulden et al. | 239/64 |
| 4,876,647 | 10/1989 | Gardner et al. | 364/528.19 |
| 5,097,861 | 3/1992 | Hopkins et al. | 137/78.3 |
| 5,173,855 | 12/1992 | Nielsen et al. | 364/528.19 |
| 5,193,744 | 3/1993 | Goldstein | 239/69 |
| 5,220,876 | 6/1993 | Monson et al. | 706/930 |
| 5,246,164 | 9/1993 | McCann et al. | 239/11 |
| 5,251,153 | 10/1993 | Nielsen et al. | 364/528.19 |
| 5,278,749 | 1/1994 | De Man | 364/143 |
| 5,337,957 | 8/1994 | Olson | 239/63 |
| 5,438,817 | 8/1995 | Nakamura | 56/10.2 A |
| 5,467,271 | 11/1995 | Abel et al. | 702/5 |
| 5,487,702 | 1/1996 | Campbell et al. | 56/10.2 B |
| 5,539,637 | 7/1996 | Upchurch et al. | 364/528.19 |
| 5,606,850 | 3/1997 | Nakamura | 56/10.2 A |
| 5,621,666 | 4/1997 | O'Neall et al. | 364/528.18 |
| 5,668,719 | 9/1997 | Bobrov et al. | 702/2 |
| 5,699,244 | 12/1997 | Clark, Jr. et al. | 702/2 |

OTHER PUBLICATIONS

*Business Geographics Magazine*, Jul./Aug. 1995, Cover Page and p. 8.
*GPS World Magazine*, Jun. 1995, Cover Page and p. 4.
*Geomatics Info Magazine, International Journal for Geomatics*, The 100th GIM Edition, Cover Page and Editorial page.
*GIS World Magazine*, Jul. 1995, Cover Page and p. 10.
*Farm Journal Magazine*, "Irrigation by the Inch", Larry Reichenberger, Sep. 1995, p. A–2.

(List continued on next page.)

*Primary Examiner*—Donald E. McElheny, Jr.
*Attorney, Agent, or Firm*—Wells, St. John, Roberts, Gregory & Matkin, P.S.

[57] ABSTRACT

An apparatus is provided for detecting agronomic information on a field to be cultivated. The apparatus has at least one sensor configured to detect agronomic information from an area of interest from within a field. The agronomic information detected over space and time being desirable to facilitate the optimized growing of a crop. A mobile carrier is configured to carry the sensor in close proximity to the area of interest. The sensor is constructed and arranged to detect the agronomic information from the area of interest as it passes near the field. The computer has a central processing unit, a memory coupled to the central processing unit, and an electronic interface coupled between the memory and the sensor for transferring sensed information into the memory. The computer is configured to collect detected agronomic information from the areas of interest within the field. An apparatus is also provided for facilitating cultivation of an agriculture field via an interface device. One interface device is a detector. Another interface device is an effector. The apparatus can detect/measure and control the optimized growing of a crop.

52 Claims, 13 Drawing Sheets

OTHER PUBLICATIONS

*Ag Retailer Article*, "Precision Agriculture: will it Change the Way You Market?", Jim Van Winkle, Mar. 1995, pp. 52, 54–55.

Advertising Article, "ArcView for Agriculture", GIS by ESRI.

*Farm Chemicals Article*, "Make Way for Site–Specific", A. E. McQuinn, p. 20.

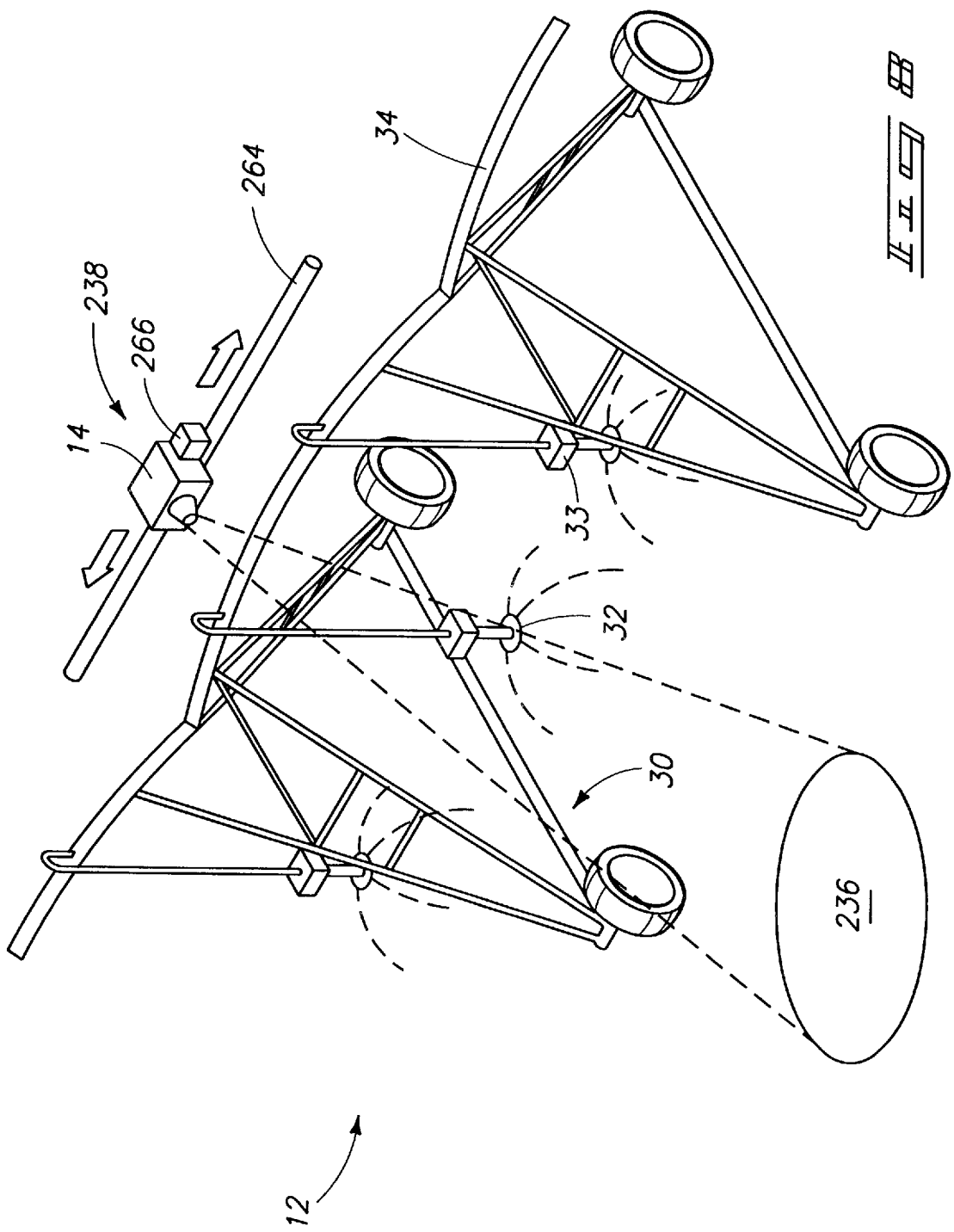

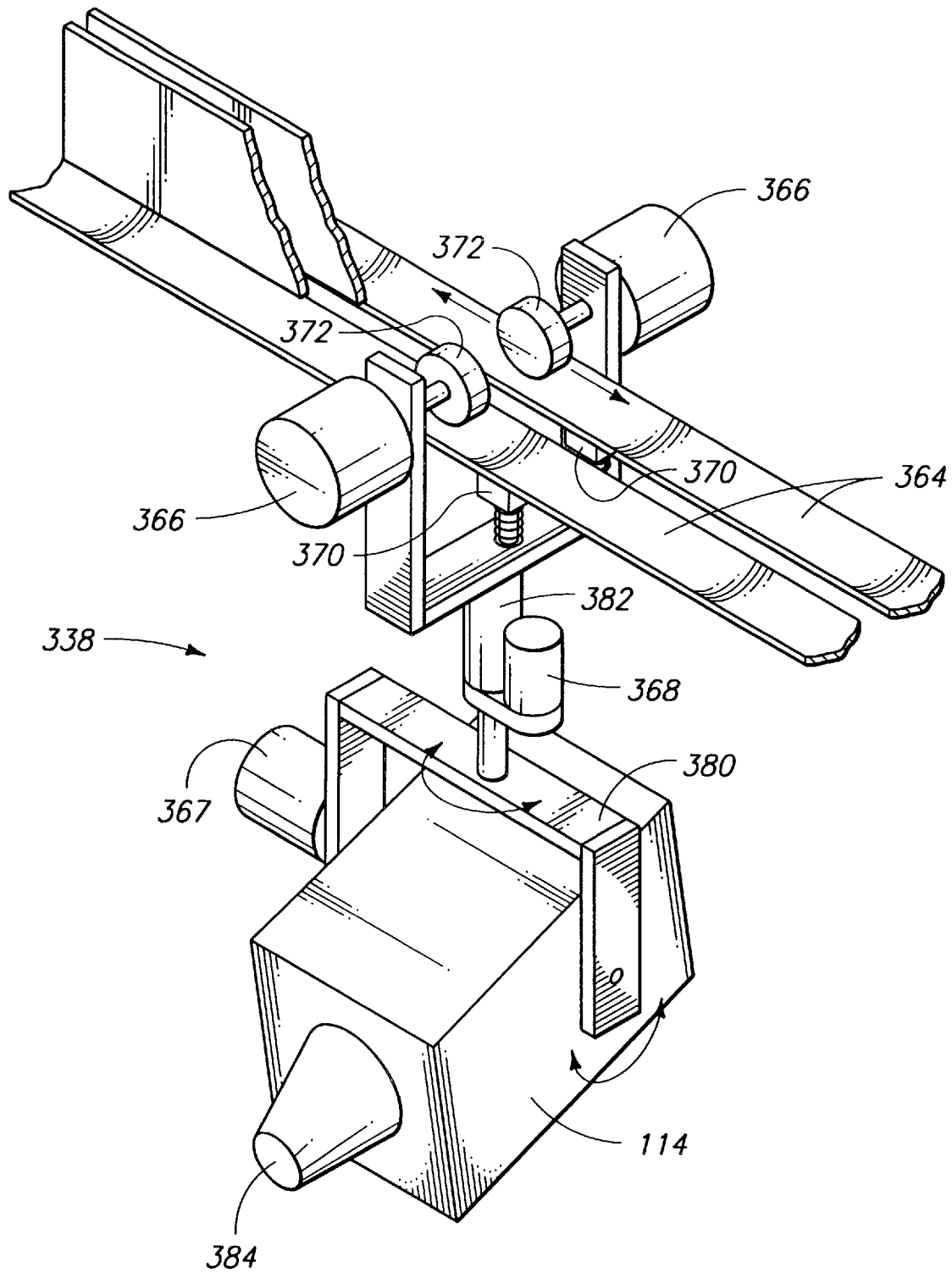

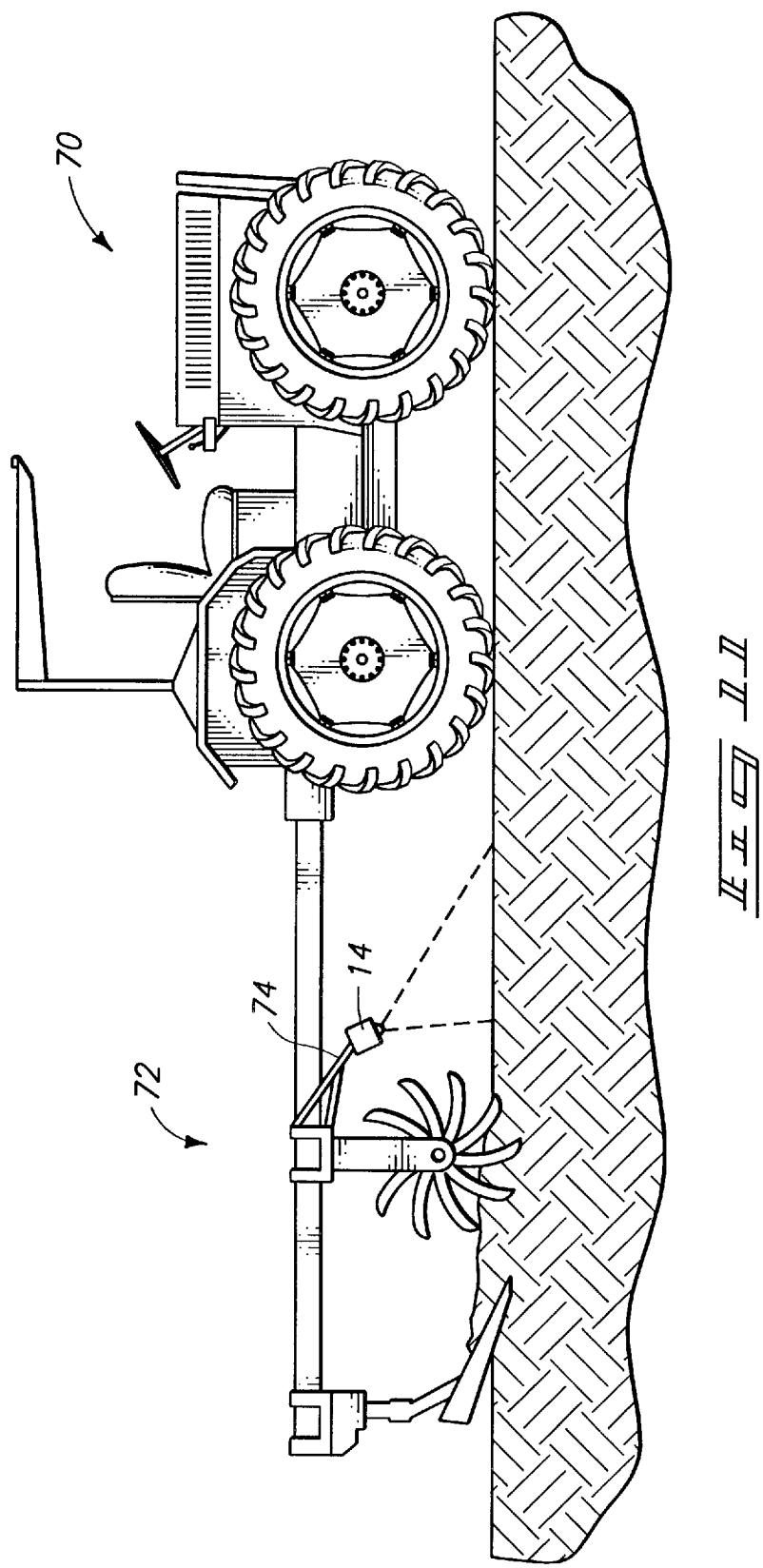

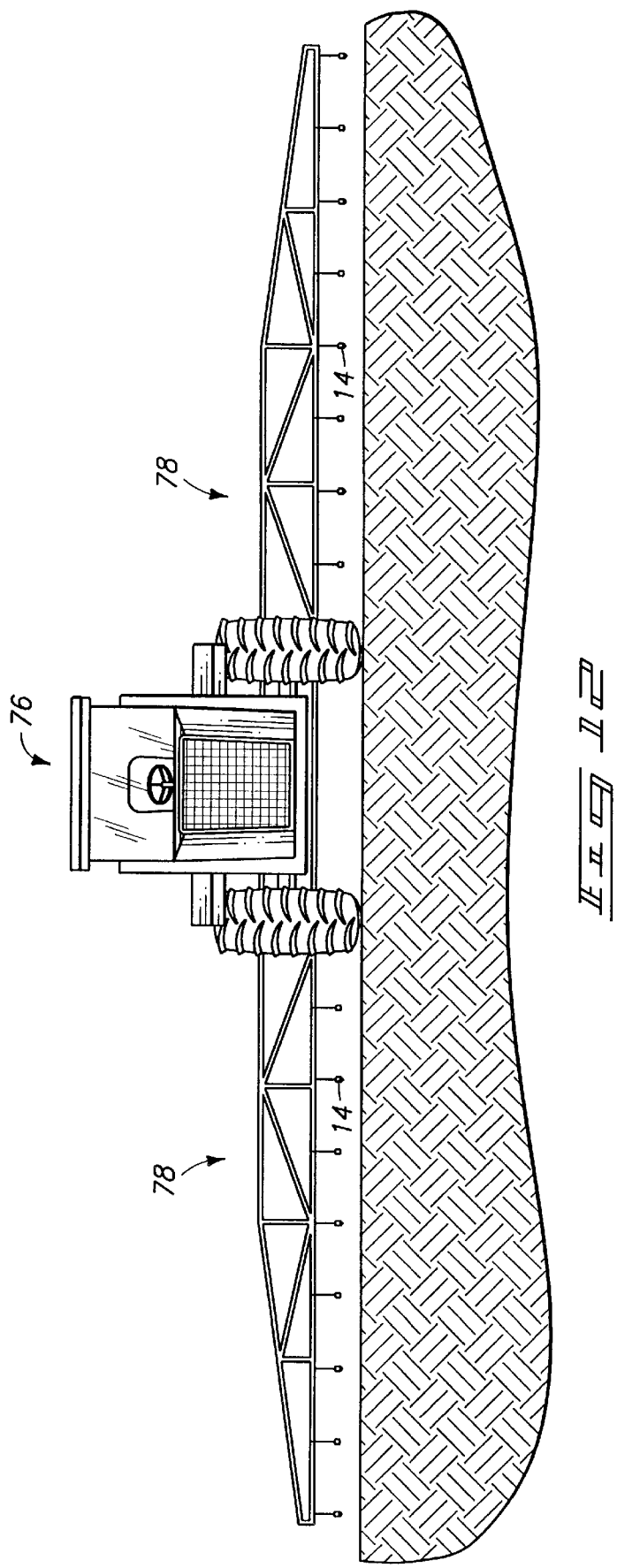

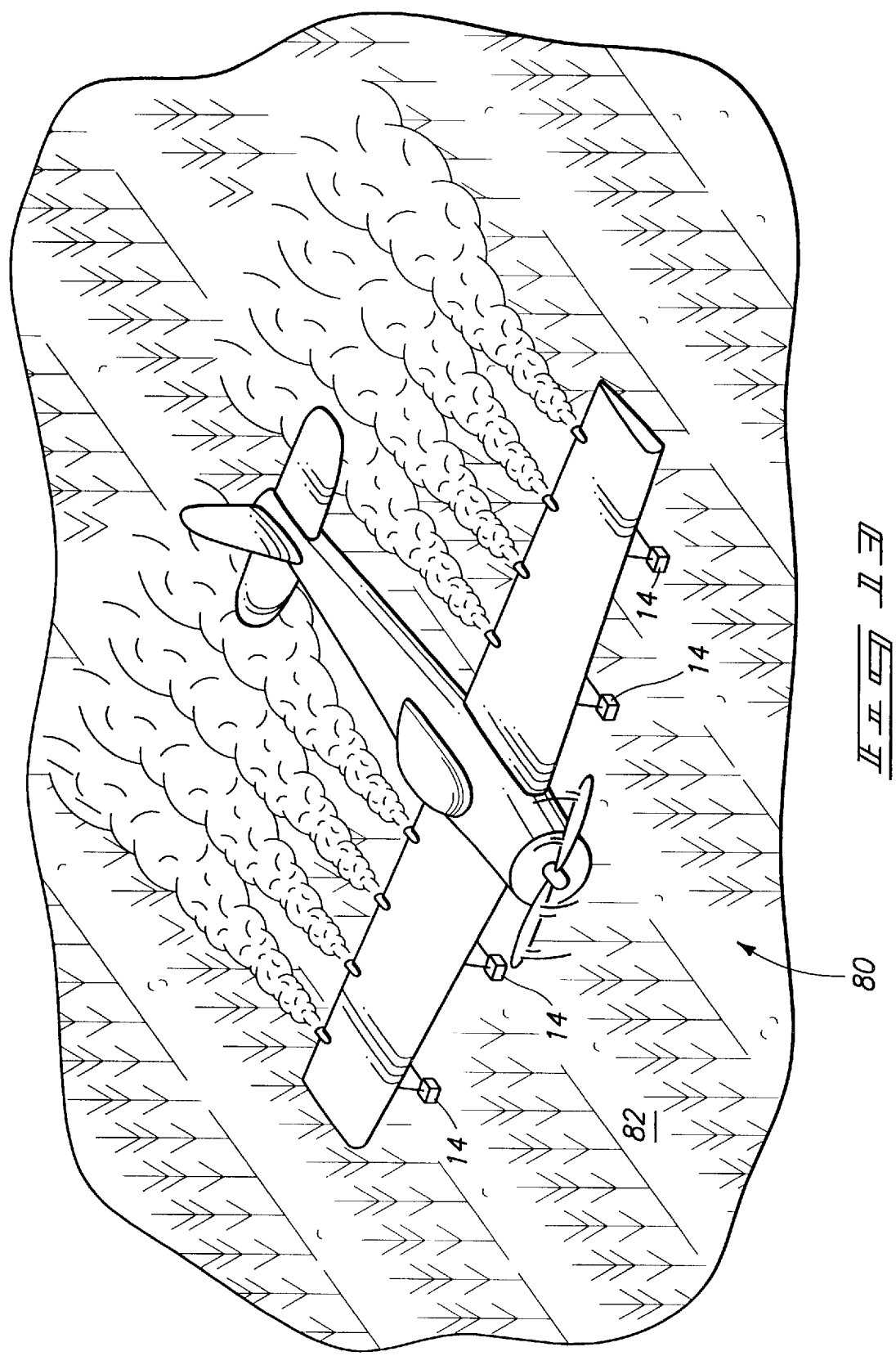

MOBILE MOUNTED REMOTE SENSING/ APPLICATION APPARATUS FOR INTERACTING WITH SELECTED AREAS OF INTEREST WITHIN A FIELD

TECHNICAL FIELD

This invention relates to a mobile mounted remote sensing/application apparatus for interacting with selected areas of interest within a field.

BACKGROUND OF THE INVENTION

The cultivation of agricultural crops has evolved over the years from the growing of crops on a large number of small family farms to the growing of crops on large scale farms. Irrespective of a farm's size, variations in terrain, soil conditions, and weather exposure can result in non-uniformities of field conditions during the preparation and growing of crops.

Individual farmers, who typically do not farm with irrigation equipment on their plots of land have learned to selectively fertilize and harvest each plot according to its specific needs. Pursuant to topological variations, some plots of land are exposed to more sunlight due to the presence of a hillside slope, better exposing the land to rays of light. Similarly, other plots of land can have an overall increased moisture content due to their presence in a valley where water is likely to collect when it rains. Typically, an individual farmer faced with the task of cultivating a small family farm, will consciously be aware of such variations. Hence, the farmer will make decisions to cultivate certain plots of land based upon their personal knowledge of soil conditions and crops being grown on each plot. Such a growing/cultivating strategy is realizable by a small scale farmer who does not have to cultivate a large number of plots of land.

In addition to sunlight exposure, individual farmers keep track of rainfall, humidity and temperature, as well as soil conditions and the occurrence of bug infestations. In some cases, soil is analyzed to determine nitrogen levels and various other conditions. In other cases, visual observation is made by a farmer as he walks through a field to detect the presence of bugs or other crop-damaging conditions. However, it is only feasible for a farmer who collects data in such a manner, to grossly categorize such agronomic information when attempting to tailor a farming strategy that maximizes crop yield therefrom. Hence, improvements that enable better collection and management of such information have been needed by individual farmers.

Additionally, the trend in agriculture has been an increase in the number of large scale farms that contain vast amounts of land, frequently divided into many plots of land. Many of these farms are run by corporations, or large groups of individuals. Due to the large amount of land being cultivated and the large number of individuals involved in such cultivation, the collection and tracking of detailed knowledge about soil and crop information over all regions of land being cultivated can be lost.

Additionally, some large scale farms employ sprinkler irrigation systems for applying water and chemicals to a crop being raised. One type of sprinkler system consists of a center-pivot irrigation device configured to apply water and chemicals to a circular plot of land. Such devices can also be adapted to irrigate square plots of land by providing end features for irrigating corner portions of such a plot via provision of a controllable end gun or articulating end boom contained therealong. A typical center pivot irrigation device has a fixed pivot, and a long body carried by an array of towers having support wheels. A plurality of sprinklers are fixed in spaced-apart relation along the arm, each sprinkler being activated via a solenoid valve to enable turning "on" and "off" of a sprinkler nozzle to regulate application of water and chemicals therefrom. In operation, the arm is rotated about the fixed pivot via the towers, as drive motors on each tower drive the support wheels, causing the device to rotate thereabout. Each sprinkler is activated via the solenoid valve to distribute water at a desired rate. The rate of application depends on the radial location of each particular sprinkler, so as to produce a somewhat uniform distribution of water around the field.

Recently, attempts have been made to enable a variable-rate application of water and chemicals to a field in order to deliver water and chemicals to regions of the field in differing amounts. One such effort is disclosed in U.S. Pat. No. 5,246,164 to McCann et al., entitled "Method and Apparatus for Variable Applications of Irrigation Water and Chemicals". A center pivot irrigation device has a plurality of sprinkler assemblies oriented in a fixed array. The array of sprinklers are operable to distribute an adjustable amount of water over a zone of ground as the arm is pivoted about the fixed pivot.

An additional area of development in the field of irrigation involves in-ground sprinkler systems that are used to irrigate relatively small plots of land. Typically, such systems consist of irrigation sprinklers that are buried in the landscaped ground surrounding large commercial buildings. Other applications include implementation of such systems on golf courses where maintenance of healthy ground cover is desirable. In one such system disclosed in U.S. Pat. No. 4,852,802 to Iggulden et al., entitled "Smart Irrigation Sprinklers", an irrigation sprinkler is disclosed which has a plurality of moisture sensing probes buried in the soil adjacent each sprinkler head. Each sensing probe is configured to develop an electrical signal representing the moisture content of soil surrounding the probe. Irrigation logic receives information on moisture content, and can compare such information with pre-established limits for preventing the supply of water to a sprinkler head when the ground is already sufficiently moist. However, such systems are impractical for use when farming large plots of land. In-ground systems are not suitable for applications where the ground must be turned over and tilled when preparing a field for the planting of crops. Likewise, in-ground sensors prove impractical because normal harvesting operations will damage or disrupt the placement of such devices. Furthermore, an extremely large number of sensing devices would be required in order to detect information from an entire field. Therefore, such an irrigation implementation on an agricultural field would prove extremely expensive. Furthermore, such a system would only provide a coarse distribution of information, because sensors would have to be spaced apart a rather significant distance in order to provide anything close to a cost-effective data collection implementation.

Another area of recent improvement in the field of agriculture involves the use of precision agriculture products. Such products typically utilize variable-rate application devices such as the above-mentioned pivot-end irrigation device, global positioning system (GPS) devices, and geographic information system (GIS). Satellite-based global positioning systems enable the determination of precise locations within a field of interest. Geographical information systems enable data management of detected conditions on a field of interest.

One presently available suitable differential global positioning system is manufactured by Trimble, and is sold under the product name Direct GPS for Arc View, Trimble Surveying and Mapping Division, 645 North Mary Avenue, P.O. Box 3642, Sunnyvale, Calif. 94088-3642.

One suitable geographic information system (GIS) is presently available from Environmental System Research Institute, Inc. (ESRI), 380 New York Street, Redlands, Calif. 92373-8100, under the name "ARCVIEW®, for Agriculture". Such a GIS system enables the management of agricultural information by way of a graphical user interface. The GIS system consists of software loaded into memory and implemented on a computer, and forms a graphical user interface that easily enables a user to tabulate data and evaluate collected data for making decisions about a crop being cultivated.

The use of precision agriculture products has been coupled with far-distance data collection techniques for determining certain agronomic features on a field being studied. Satellite imaging techniques and aerial photography techniques have enabled the collection of large amounts of data in order to characterize agronomic information and features on large fields of interest. For example, thermal imaging cameras have been used to determine certain thermal characteristics that manifest themselves on a field being observed. However, such cameras produce a gray scale array of pixels having limited resolution, and further, only collect information periodically when weather conditions permit flight overhead. Such flight-based collection is performed a far distance above a field being monitored. In some circumstances, the presence of certain crop and soil conditions will manifest themselves in the form of a thermally detectable variation upon the land. Similar detection can be performed in the visible, infrared and ultraviolet ranges, enabling the determination of correlated features with such information.

However, the ability to collect agronomic information on a field of interest via far-distance detection techniques often-times has limited capabilities. For example, inclement weather conditions can prevent the collection of information by blocking the ability to detect agronomic features. For cases of satellites, even the presence of moderate cloud cover can disrupt detection of such information. During certain periods of a growing cycle for a crop, the detection of such information can be critical to successful harvesting, as well as to the implementation of remedial measures that must be taken in order to counteract the effects of a bug infestation or fungal attack on plants. Hence, an improved technique which enables the detection of such agronomic information during any time of day, and under any type of weather condition, is desired. Furthermore, a sensing device that enables the detection of an increased number of different agronomic features is also desired. Additionally, a detection device that does not harm crops during the detection process, yet enables the collection of agronomic information while crops are being grown, is also desirable.

Although a number of precision agriculture products have recently been made available to the farming community, little has been done to enhance the ability to collect large amounts of data in a way which does not interrupt with the preparation and growing of a crop on a field. Therefore, there is a present need to enhance the ability to detect information about soil conditions and crops, while substantially leaving the field uninterrupted during the data collection process.

Another presently unresolved problem is a general inability to monitor and evaluate the condition of crops during each growing cycle. Presently, an individual farmer has to selectively sample and/or observe crop characteristics during a growing cycle in order to make projections about yield and productivity. However, such a crop-yield productivity system is dependant heavily upon the number of sample observations made by an observer, as well as the particular location of such sample sights being selected. Therefore, there is a need to improve the monitoring and sampling of crop status and growing conditions in order to better make projections on crop-yield during a particular growing cycle. Such information would prove useful in predicting overall crop yields, as well as making decisions on whether or not a crop surplus is available for selling to particular customers and foreign governments.

Therefore, a need has arisen for a system which provides for collection of such agronomic information, and further provides for collection of such information in a format suitable for use with presently available geographic information systems (GIS) and global positioning systems (GPS). Hence, there is a need to provide input of such information to crop modeling programs, either on request, or automatically.

Yet another presently unresolved problem is a general inability to precisely apply water and/or chemicals locally to specific locations on a field and according to detected needs. More particularly, there is a need to apply water and/or chemicals locally, yet over large plots of land being cultivated, particularly in response to detected needs. Even further, there is a need to combine local detection of agrarian needs and application of water and/or chemicals to meet such needs within a single device capable of detecting needs and/or applying water/chemicals to meet such needs.

BRIEF DESCRIPTION OF THE DRAWINGS

Preferred embodiments of the invention are described below with reference to the following accompanying drawings.

FIG. 7 is an enlarged schematic perspective view of a second alternatively constructed remote sensing apparatus carried on the end portion of the irrigation device of FIG. 1;

FIG. 8 is an enlarged schematic perspective view of a third alternatively constructed remote sensing apparatus movably carried along the irrigation device of FIG. 1;

FIG. 10 is a further enlarged schematic perspective view of the sensing/applying apparatus of FIG. 9;

FIG. 12 is a front elevational view of an illustrative tractor and crop spraying device incorporating elements of a remote sensing apparatus of this invention; and FIG. 13 is a schematic perspective view of an illustrative crop-duster airplane incorporating elements of a remote sensing apparatus of this invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect, this invention comprises an apparatus that is provided for detecting agronomic information on an agricultural field. The apparatus has at least one sensor configured to detect agronomic information from an area of interest from within a field. The agronomic information detected over space and time being useful to facilitate the optimized growing of a crop. A mobile carrier is configured to carry the sensor in close proximity to the area of interest. The sensor is constructed and arranged to detect the agronomic information from the area of interest as it passes near the field. The computer has a central processing unit, a memory coupled to the central processing unit, and an electronic interface coupled between the memory and the sensor for transferring the detected agronomic information into the memory. The computer is configured to collect the detected agronomic information from the areas of interest within the field.

Figure 1:
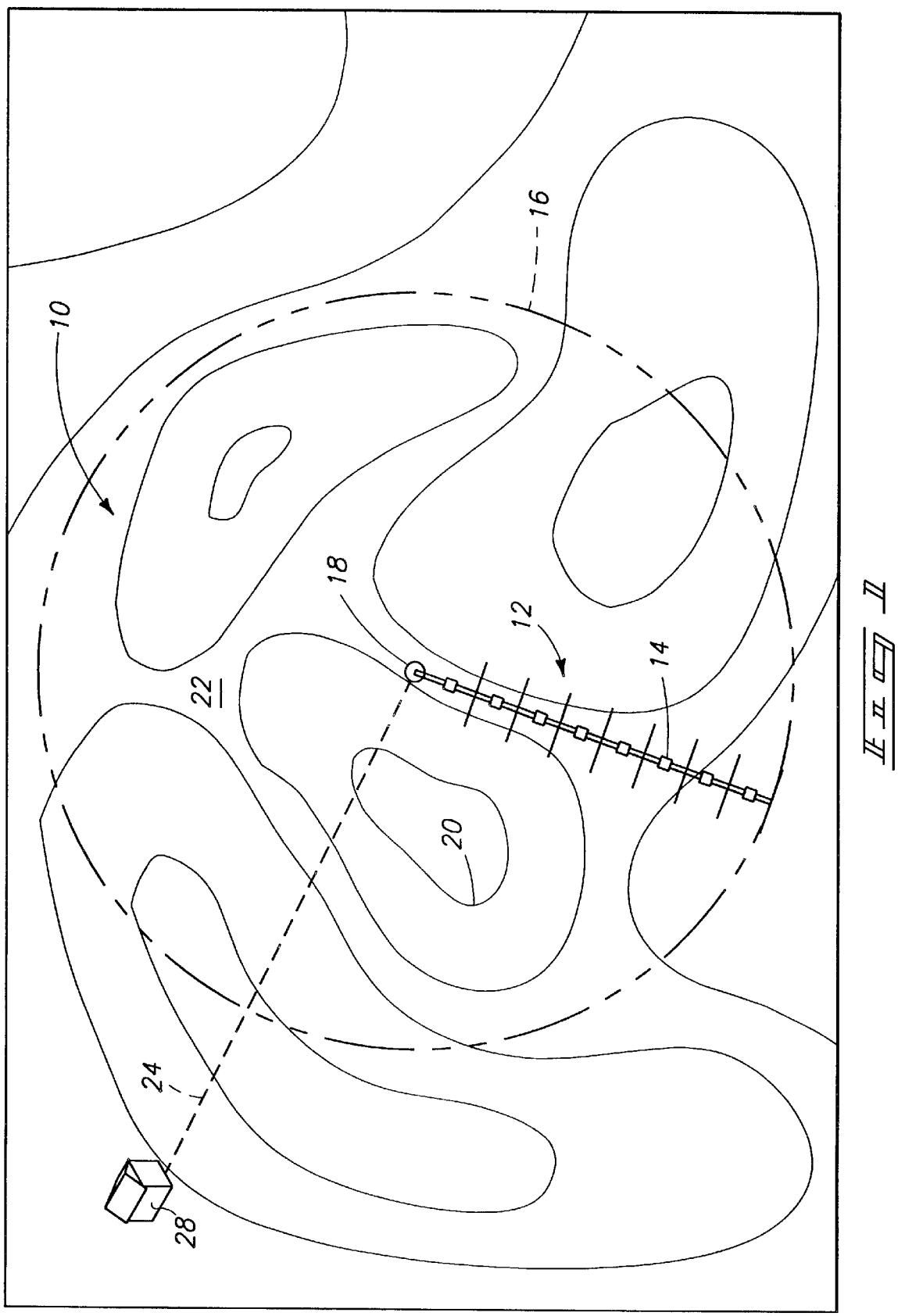
FIG. 1 is a plan view of an illustrative center pivot irrigation device incorporating elements of a remote sensing apparatus of this invention.

With reference to FIG. 1, a representative agricultural field generally designated by reference numeral 10 is shown with a center pivot irrigation device 12. Device 12 is configured to support and carry a plurality of sensing devices 14 across field 10 within the boundaries of a bounded area 16 being cultivated. Irrigation device 12 is configured to rotate about a fixed pivot end 18 within area 16. Field 10 is depicted with varying topographical features, including elevated portions or hills 20, and depressed regions or valleys 22. Irrigation device 12 supports a mobile-mounted remote sensing apparatus formed at least in part by sensing devices 14. In addition, an electronic interface is carried by pivot end 18, including a power line 24 that supplies power to device 12 as well as transmits collected information in digital form between device 12 and base 28. Home base 28 includes computer-based equipment for processing the detected agronomic information.

Power line 24, as well as a water supply line (not shown) are buried beneath field 10 for supplying power and water to irrigation device 12. In one version, digital signals are transmitted between an electronic interface and computer supported at pivot end 18 and another computer at home base 28 (see FIG. 3 discussion). With this implementation, digital signals are superposed over the 60 Hz power supply being provided over power line 24. By transmitting such digital information over a frequency other than 60 Hz, the collected digital information can be separated from the power supply being provided via power line 24. In this manner, the need for an additional dedicated communication line is eliminated. Alternatively, a separate communication cable can be buried along side the power line, between pivot end 18 and home base 28. Further alternatively, an optical cable can be used to transmit optical signals therealong. Even further alternatively, radio frequency antennas can be provided at pivot end 18 and home base 28, enabling radio frequency communication of collected information and device control commands therebetween. Even further optionally, the entire computer-based equipment system can be provided at home base 28. Alternatively, such entire computer-based equipment system can be provided at pivot end 18.

The computer-based equipment on device 12 and home base 28 form a crop management system that allows for the monitoring of sensed agronomic information collected by device 12. The collected data is then reduced by way of the information system provided at home base 28, enabling collection and storage of such data therein. Details will be further discussed below with reference to FIGS. 3 and 4.

In addition to the elevational terrain changes depicted in FIG. 1 in the form of hills 20 and valleys 22, a number of other varying agronomic features might be found and detected on field 10 via device 12. Such features would produce detectable variations of agronomic information on the field. For example, the consistency of soil provided on field 10 can vary between clay, sand, and a mixture of sand and rock. Regions containing rocky and sandy soil will tend to drain water from the surface layer of soil rather quickly. Therefore, such regions will typically have drier soil conditions, on average. Likewise, regions that have a high clay content will tend to retain water, having a higher moisture content, on average. Furthermore, the presence of hills or trees adjacent to the outer periphery of area 16 can result in a decrease in light being transmitted to certain regions of the field. For example, shade trees placed along the edge of a field can result in less light being received along a portion of a field. Such a lower light level will result in a decreased amount of evaporation occurring in that region of the field. Furthermore, the reduced levels of light can result in a longer time being required for the growing of crops in that region.

Another agronomic feature suitable for detection on field 10 is the advancement and presence of a bug infestation within a crop growing on field 10. External factors such as bug infestations can cause detectable topographical variations to agronomic features of a field 10 according to FIG. 1. The presence of bugs in certain regions can affect the yield of crops in such regions. In cases where the presence of such bugs are detected, a non-uniform field distribution of bugs can be sensed and tracked in order to make decisions on the spraying of chemicals and pesticides to detected regions of the field. Additionally, the advancing boundary line of infestation can be monitored in order to take preventative and/or remedial measures to control or eliminate such an infestation. Likewise, sensed information can be used to determine and/or predict variations in crop yield resulting therefrom.

Several different techniques can be used to sense the presence of bugs within field 10. One technique involves the detection of minute concentrations of chemicals, such as pheromones, via sensors 14 that are given off by large populations of bugs. Another technique involves thermal detection of such bugs, which results in thermal variations within a field. A further technique involves performing indirect measurements to detect the presence of bugs where detectable color changes to the crop indicate the presence of bugs therein. For example, optical detection of color changes to foliage can be utilized to characterize the presence or absence of bugs from within a region of a field.

Figure 2:
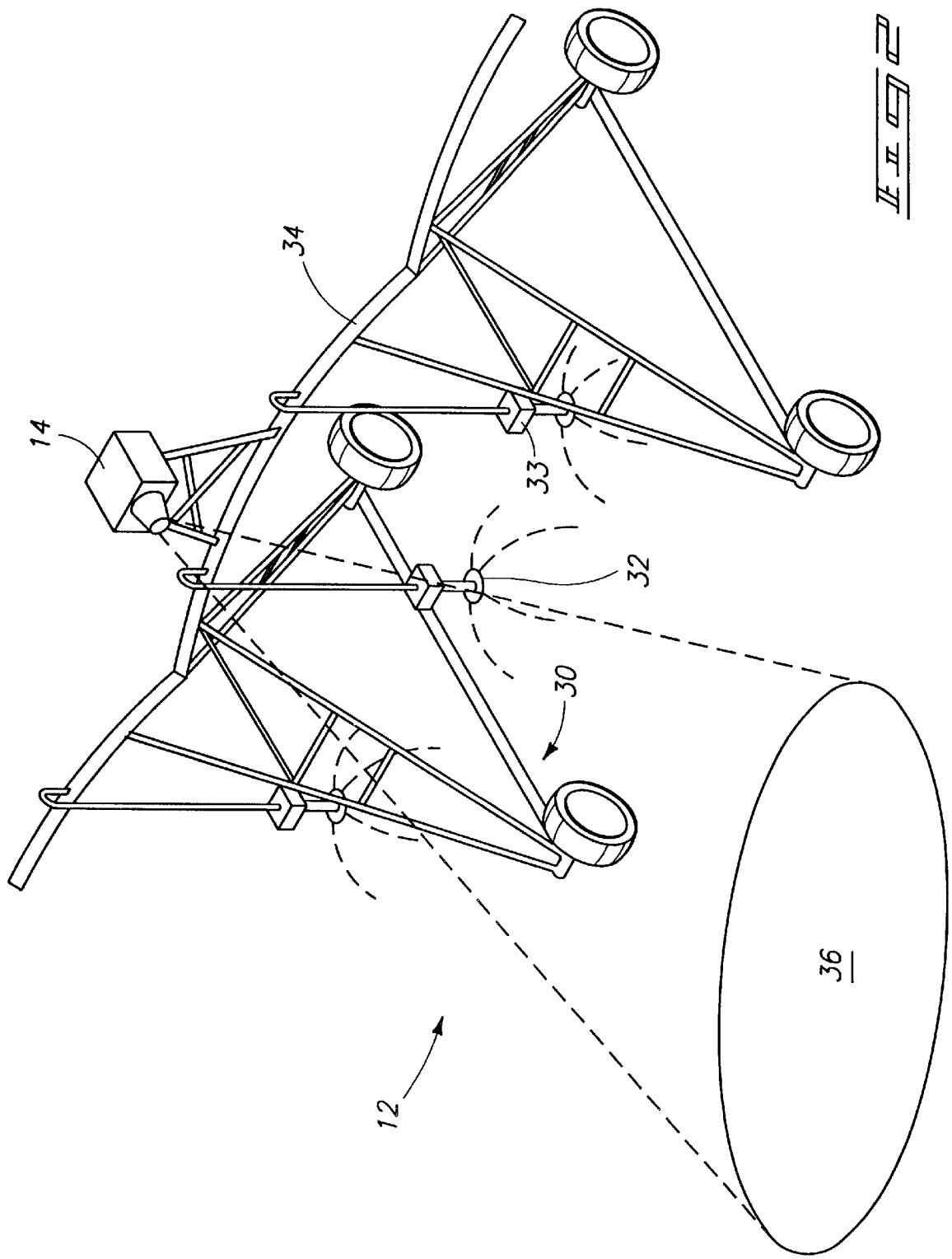
FIG. 2 is an enlarged schematic perspective view of a portion of the irrigation device and remote sensing apparatus of FIG. 1.

FIG. 2 illustrates an enlarged perspective view of a portion of irrigation device 12, including one of an array of sensing devices 14. Sensing device 14 is rigidly mounted atop device 12 by way of a vertically extending mast-portion. Device 12 is supported for rotation about pivot end 18 (See FIG. 1) by a plurality of spaced-apart support towers 30. As shown in FIG. 2, each support tower is provided with a tandem pair of wheel assemblies. Each wheel assembly is formed from a pair of wheels mounted side-by-side on a common axle. At least one of the wheels on each tandem wheel assembly is driven by a servo drive motor. Such a construction provides for suitable traction over the soft ground of a field being cultivated. Alternatively, only one of the wheel assemblies is driven by servo drive motor. Activation of the drive motors on each tower via a computerized control system housed in home base 28 (of FIG. 1) drives irrigation device 12 in pivotal rotation about fixed end-pivot 18 (of FIG. 1). A plurality of sprinklers 32 are also distributed in spaced-apart relation radially along irrigation device 12 for delivering water and/or chemicals to the agricultural field. A servo controlled valve, provided upstream of each sprinkler 32, is computer controlled to regulate water delivery to each sprinkler 32. Alternatively, a solenoid relay controlled valve can be used to regulate water delivery to each sprinkler 32.

Pairs of adjacent support towers 30 are connected together by a boom arm 34, as shown in FIG. 2. Each boom arm can be unfastened from, or fastened to an adjacent support tower, enabling lengthening and shortening, respectively, of the irrigation device 12 to tailor it for use with a particular field application. Sensing device 14 is carried on boom arm 34 in an elevated location relative to sprinklers 32 so as to detect the presence of a field condition within an area of interest 36 on the field. Such provides an unobstructed view of the area of interest 36.

In operation, as irrigation device 12 is moved across the field, sensing device 14 detects agronomic information from within the area of interest 36. As device 12 and sensing devices 14 move across a field, area of interest 36 passes along a circular path, collecting information therefrom. By suitably configuring a plurality of sensing devices 14 in proper spaced-apart relation, information can be detected from substantially all of the areas, or regions of the field contained within the bounded area 16 (as shown in FIG. 1). After detecting the information, a computer and a geographic information system (GIS) can be used to direct application of chemicals (including water) to areas of interest within a field via irrigation device 12.

Figure 3:
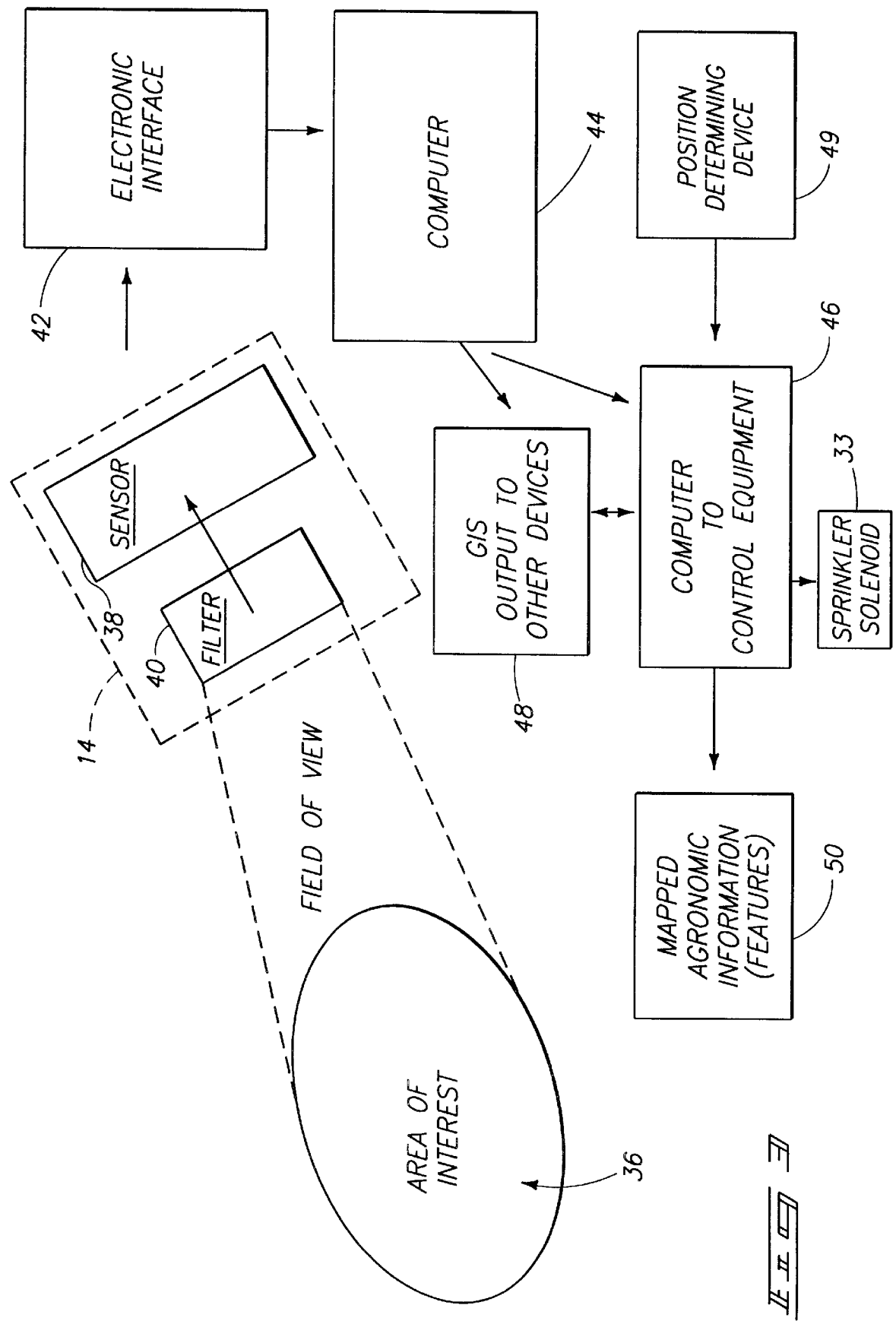
FIG. 3 is a schematic block diagram illustrating the data collection system used with the remote sensing apparatus of the first embodiment of this invention, and carried by a center pivot irrigation device.

FIG. 3 illustrates one suitable implementation for the detection and collection of information being sensed from a field by way of sensing device 14. Sensing device 14 forms a sensor that is configured to detect a sensed condition from area of interest 36, by detecting the area of interest 36 via a field of view. Sensing device 14 includes a sensor 38 and a filter 40 configured to massage or filter information being detected from the area of interest prior to being detected by sensor 38. Alternatively, filter 40 can be configured to filter information from a signal output from the sensing device 14, thereby cleaning up the signal. Detected information is delivered from sensing device 14 via an existing power line that extends along the booms of the irrigation device to an electronic interface 42. The boom power line (not shown) supplies power to the drive motor on each wheel assembly. Information is delivered along the power line similar to the way information is delivered between pivot end 18 and home base 28 via power line 24. Typically, electronic interface 42 can be provided in a fixed, or stationary location at the fixed pivot end of the irrigation device. A rotating electrical connection, or slip ring is formed at pivot end 18 (of FIG. 1). Likewise, a computer 44 can be similarly provided adjacent the pivot end for processing information and transferring same to home base 28.

In operation, the electronic interface 42 of FIG. 3 receives detected signals from each of the plurality of sensors 38 configured along the device. Interface 42 delivers the signals to computer 44 where they are selectively processed. Preferably, each sensor 38 is separately addressable, enabling identification of data transmission therefrom. Electronic interface 42 consists substantially of circuitry and filters that enable the conversion of analog-sensed information into a digital format that can be readily received by computer 44. Alternatively, sensor 38 can produce a digital output that is received by interface 42 in a format suitable for transmission to computer 44. Further alternatively, sensor 38 can be provided in direct field of view of area of interest 36, with filter 40 being provide between sensor 38 and electronic interface 42. In this configuration, filter 40 is used to filter analog or digital information from sensor 38 before being delivered to interface 42. Computer 44 then delivers information to another computer 46 that is configured to control the operation of equipment used to prepare and cultivate the field.

As shown in FIG. 3, computer 44 can convey sensor detected information to a geographic information system (GIS) 48 suitably configured for output to other devices, such as computer 46. Additionally, or alternatively, computer 44 can convey the sensor detected information directly to computer 46. For example, power line 24 (of FIG. 1) conveys detected sensor information from computer 44 on device 12 to computer 46 at home base 28. Geographic information system (GIS) 48 provides certain benefits in tabulating and visualizing data that was detected by sensor 38. For example, yields can be estimated while crops are still growing in the field. Furthermore, a position determining device 49 is also configured with the sensor 38. Device 49 enables one to correlate sensor position information with the sensed information from sensor 38. In this manner, detected sensor information from area of interest 36 can be stored, or mapped into memory by computer 46 over all of the detected regions in field 10 being scanned by sensing devices 14. Hence, the exact location of an area of interest 36 within an agricultural field being monitored becomes readily known during the sensing of such information. Alternatively, position determining device 49 can input sensor location information pertaining to area of interest 36 directly into computer 44, which is forwarded to computer 46. Detected information from sensor 38 and position information from device 49 are correlated via computer 46 where they are formatted in a mapped configuration for tabulating mapped agronomic information, or features 50, in a computer database. In one version, a look-up table is used to store information being collected for areas of interest within a field.

Computer 44 of FIG. 3 is formed from a micro computer having a central processing unit, one or more forms of memory, a plurality of input/output ports, and transmitting/receiving circuitry. For constructions that use an array of antennas in place of power line 24 (of FIG. 1), an antenna couples with the circuitry to enable transmitting and receiving information with a similarly configured computer system contained in home base 28. Alternatively, computer 44 can be wired directly via input/output ports and power line 24 (of FIG. 1) with computer 46 and/or the geographic information system (GIS) 48. Further alternatively, computer 44 and computer 46 can be one and the same, wherein a geographic information system (GIS) is loaded into software in the computer for performing formatting and tabulation of data received from sensed agronomic features via sensors 38.

Computer 46 of FIG. 3 is formed from a central processing unit, memory, input/output ports, and any of a number of peripheral devices. Suitable peripheral devices include a keyboard, a user-viewable screen display, a CD/ROM data storage device, a hard drive, a modem, a telephone and telephone line, a radio, and a floppy disk drive. Additionally, software (including a WINDOWS® environment, interface software, and the above-mentioned geographic information system) is loaded into memory within the computer. Such software integrally forms a graphic user interface, viewable by an operator via the display screen, and reconfigurable via the keyboard and/or a mouse input device.

The provision of a telephone, either hard wired or cellular, enables communication via the telephone with remote locations from the device to enable data collection and remote control of the device. In fact, any of a number of wireless communications links can be provided in combination with the device of this invention to enable remote monitoring and control. For example, telephone connectivity can be used to enable Internet access to the device and its associated computer and control systems. Accordingly, requests can be received by the device of this invention from the outside work, for example from a cellular telephone, to direct the device to focus on a particular area of interest within a field.

Geographic information system (GIS) 48 is a presently available software-based product that can be readily purchased. One version presently available from Environmental System Research Institute, Inc. (ESRI), of 380 New York Street, Redlands, Calif. 92373-8100, is sold under the name "ARCVIEW®, for Agriculture".

Position determining device 49 of FIG. 3 is formed from a global positioning (GPS) receiver. One such presently available device is manufactured by Trimble, and is sold under the product name Direct GPS for ArcView, Trimble Surveying and Mapping Division, 645 North Mary Avenue, P.O. Box 3642, Sunnyvale, Calif. 94088-3642. Alternatively, position determining device 49 can be formed from a compass, such as a digital flux gate, or magnetometer compass formed on the arm of device 12 (of FIG. 1). The compass monitors the rotated position of an irrigation device relative to the fixed end-pivot, enabling the determination of the location of a sensing device carried on the irrigation device at a radially fixed location. Alternatively, a shaft encoder can be substituted for the compass. Knowledge of the radial location of a sensing device provided on the irrigation device, in combination with knowledge of the rotated position of the irrigation device, allows one to determine the precise location of an area of interest 36 being detected within a field. Knowledge of the set-off distance between the sensing device 14 and the area of interest 36 enables accurate location of area 36 with respect to the sensing device 14. Further alternatively, a rotary potentiometer can be utilized at the linkage between the end-pivot of the irrigation device and the arm of the irrigation device in order to determine the rotated position of the device therebetween. Such optional constructions enable economical determination of the position of an area of interest 36 being detected by a sensor 38.

As shown in FIG. 3, computer 46 is housed within home base 20 (see FIG. 1) where it receives sensor detected agronomic information via power line 24 from sensors 14 along device 12. Computer 46 collects such information, preferably in a suitable format configured via geographic information system (GIS) 48, and simultaneously maps the position of sensor 38 in relation to a detected area of interest 36 by simultaneously collecting information from position determining device 49. In this manner, sensed information is combined with positional information to form a tabulated database of agronomic information over the cumulative areas of interest within a field. By collecting such agronomic information via sensor 38 at various points in time, the tabulated information can be combined to form a collection of sensed agronomic information and position information that extends across space and time. Computer 46 is then able to produce mapped agronomic information 50 in the form of data files, or look-up tables, that are subsequently used by the computer to make control decisions for performing soil and/or crop operations during cultivation of a field. For example, computer 46 can direct control of solenoids 33 to operate sprinklers and apply variable rates of water and/or chemicals to a field, as need be, pursuant to the detected agronomic information collected from the field.

Additionally, closed loop control can be implemented "on the fly", as device 12 detects agronomic information on a field, then operates solenoids 33 according to determined/detected needs in order to deliver variable rates of water and/or chemicals to the field. In this manner, device 12 forms an apparatus for detecting/measuring and subsequently controlling the optimized growing of a crop in a field.

According to the implementation of FIG. 3, a variety of different types of sensors can be utilized with electronic interface 42 and computers 44 and 46 to detect a variety of different agronomic information from a field being cultivated. Detected features are mapped to a location where they are detected via a mapped agronomic information database 50. Database 50 forms part of a crop management system implemented via the computer 46 and geographic information system (GIS) 48.

According to the device of FIGS. 1–4, a variety of sensing devices 14 having sensors 38 can be carried across a field to detect agronomic information from an area of interest. One type of sensor is an imaging camera configured to detect electromagnetic radiation from within a field of view. In one version, the camera is a line-scan video camera that produces a gray scale output indicating detected conditions from within the field of interest, as area of interest 36 scans the field. For example, thermal radiation cane be detected by the camera. Alternatively, infrared radiation can be detected by the camera. In another configuration, ultraviolet radiation can be detected from the camera. Detected thermal radiation can be used as an indication of the presence of bug infestation within a region being detected. Detection of high amounts of infrared radiation can be used as an indication of abnormal leaf conditions on plants within the region being detected. Detection of abnormal amounts of ultraviolet radiation can be used to indicate foliage and plant conditions being detected.

An additional camera configuration for sensor 38 envisions a digital camera for detecting visible light outputting Red, Green, and Blue (RGB) values in a standard digital format. Even further, one version of such a camera can be used to detect foliage color of a crop in order to estimate fertility and micro-nutrient levels present in the field of interest.

Another configuration for sensor 38 envisions the use of a temperature sensor for detecting the thermal exposure of crops within the field of interest. For example, a temperature measuring device can be used to detect the near-ground temperature adjacent to crops in the field in order to determine whether particular plants have been subjected to frost, or freezing conditions. Hence, such agronomic information can be used by computers 44 and 46 to schedule remedial measures following localized damage to crops resulting from a recent frost. For example, frost may occur within low-lying valleys of a field, whereas high-lying areas are not damaged by the presence of such frost. Subsequent applications of fertilizers and water to the field can be adjusted so as to at least in part alleviate abnormal crop growth from a detected occurrence. Additionally or alternatively, selected regions of a field can be harvested at a different time, due to detected conditions that have affected the growth rate of a crop. Examples of thermal sensing devices include resistive thermometers, such as platinum resistive thermometers (or PRTs), thermistors, thermocouples, and semiconductor-based PN junctions. Various other commercially available types of sensors can also be used for detecting any of a variety of agronomic information from a field of interest.

Another type of sensing device suitable for use in forming sensor 38 includes any of a category of light detecting sensors used for measuring light intensity being subjected onto a field. For example, a photovoltaic sensor, similar to a solar cell, can be used to detect the presence of light impinging on an area of interest on a field. Such a semiconductor-based device as a photodiode can be used to measure light intensity, producing an output voltage dependent upon the amount of light falling on the device. Alternatively, a photoconductive sensor can be configured to detect changes in current flow therethrough proportional to the intensity of incident light projected onto the device. Another type of photoconductive device is a light-dependent resistor (LDR) which produces a change in resistance when illuminated. Such devices typically respond to different wave lengths of light in a manner very similar to that of the human eye. However, such devices have a moderately slow response rate. For purposes of agrarian detection, such a response rate is not deemed to be critical. Another optical sensor configuration utilizes optical, or opto-switches having a light sensor, typically a photo transistor, and a light source, usually a light-emitting diode (LED). Such a device can be used to detect the presence of an object, or position, motion, and temperature associated with the sensor. For example, such a device can be configured to detect the presence of a bug between a source and a sensing element on the sensor. Likewise, such a device could be configured to detect the presence of snow flakes, or water droplets between a source and a sensing element on the sensor device. Alternatively, the light source can be eliminated, and a mirror can be added such that the detector is aligned with the mirror in order to detect the presence of an object therebetween.

Furthermore, any of a number of sound-detecting sensing devices can be used for sensor 38 in order to detect agronomic information from a field of interest. For example, a carbon microphone, capacitive microphone, a moving coil microphone, or a piezoelectric microphone can be used to detect sound waves from within a field of interest. One example would be to detect the presence of thunder in an effort to characterize any severe or inclement weather condition. Another example would be to detect sounds produced by bug infestations, such as the presence of grasshoppers or locusts present within areas of interest.

Additional devices for detecting agronomic features can be envisioned for use as sensors 38, including wind meters for detecting near-ground levels of wind that might affect the growing characteristics of a crop being cultivated. For example, winds can have an effect on the pollination of certain crops contained within a field. Analysis of such winds can provide a better understanding of the effect winds have on pollination during certain critical periods in the growth cycle of a plant. Similarly, extremely high levels of winds can have a damaging effect on a crop, stressing the plants and affecting their rate of growth subsequent thereto. Hence, such information can be utilized to determine remedial measures to be implemented in the growing of a crop that might ameliorate such a stress condition to a plant. Additionally, the decision on when to harvest such a crop can be rescheduled pursuant to the availability and studying of such information via a crop management system.

Other similar devices can include meters configured to measure the amount of rainfall that has fallen on a location of the field. Similarly, force sensors such as strain gauges and piezoelectric sensors can be used to detect the effects of hail and sleet upon a crop within a field. Additionally, various chemical detection sensors can be utilized to monitor soil conditions within the ground of a field. Likewise, moisture sensors can be utilized to directly detect the moisture content within soil, by configuring the sensor so it is intermittently inserted within the soil in the field of view as it is carried over the field by the irrigation device. Furthermore, such sensors can be used to detect the presence or lack of soil-based nutrients, such as nitrogen, from within the soil contained within the area of interest covered by the field of view.

An additional sensing feature that can be provided by the device of this invention includes various sensors used by a weather station for detecting weather conditions in a field being cultivated. Such sensors may include several of the aforementioned devices, as well as standard meteorological devices used to detect temperature, humidity, wind, and rainfall. Such meteorological weather-based information can be detected directly on device 12 (of FIG. 1), or directly at home base 28. Such information is compiled by computer 46 (of FIG. 3) where it is used to make decisions about controlling various operations during the cultivation of a crop. For example, decisions can be made on when to operate is a sprinkler via control of solenoid 33 by computer 46. Such an implementation forms a closed-loop system, where a sensor 38 detects a water condition from within an area of interest 36, after which computer 46 makes determinations as to the need to water such area of interest. In response to such a decision, computer 46 can enable or disable operation of the sprinkler via solenoid 33 (as shown in FIG. 3). Alternatively, information being collected can form an open-loop system, wherein information is accumulated over time for each of the areas of interest within the field in order to make decisions on when a crop should be harvested. Additional decision making based upon collected, or tabulated agronomic information would provide a similar open-loop system for determining crop growing decisions.

Computer 46 can also be configured to implement any of a variety of artificial intelligence techniques to enhance the collection and processing of sensed data from within an area of interest of a field. For example, neural-network and fuzzy logic implementations can be utilized in order to facilitate compilation and processing of data into a manageable quantity suitable for making decisions about operations to be formed on a field being cultivated. For example, detected levels of the sun, moisture, and temperature distributed in varying proportions across a field being cultivated, enable a farmer to make decisions about which regions of a particular field require additional watering, and which regions no longer need any additional water. In this manner, savings can be made in preventing the waste of water and chemicals being applied to areas of a field where they are not needed. Furthermore, over-watering of certain regions of a field might lead to mold and fungal infestations that can prove deleterious to the growth of a crop.

Figure 4:
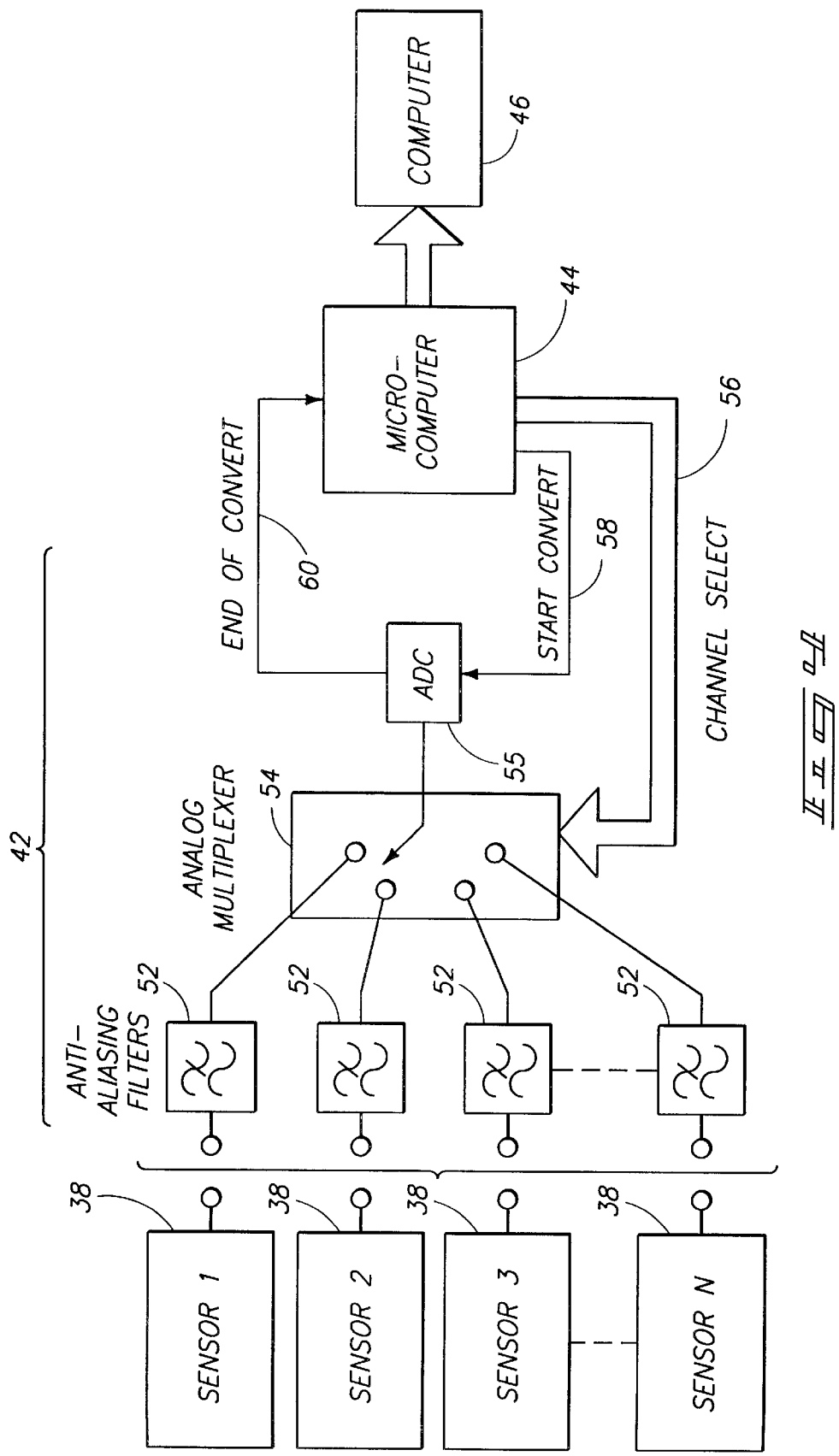
FIG. 4 is a schematic block diagram illustrating a data collection multiplexing configuration suitable for collecting information from a plurality of remote sensing apparatus carried by the center pivot irrigation device of FIGS. 1–3.

According to FIG. 4, an array of sensors 38, as carried on an irrigation device, are depicted for selective monitoring via electronic interface 42 and for input to micro computer 44, and computer 46. FIG. 4 illustrates a data acquisition device suitable for presenting detected agronomic information to a crop management system. Detected agronomic information is received from each of sensors 38 (i.e. sensors 1-n) as they are carried over a field to be cultivated. However, in order for computer 44 to be able to detect all of the incoming signals, an analog signal multiplexing scheme is implemented via multiplexer 42. Essentially, "n" sensed analog input signals are input into micro computer 44 in the form of digital signals, after which they are transferred to computer 46 for use by a crop management system.

Alternatively, sensors 38 of FIG. 1 can produce digital output signals, wherein filters 52 and multiplexer 54 are both digital. Filters 52 will digitally filter the output signals from sensors 38, after which multiplexer 54 will selectively configure communication between microcomputer 44 and sensor 38 for data transmission therebetween. In such an implementation, the need for an analog to digital converter (ADC) 55 is eliminated. Collection of such information in a digital form requires implementation of anti-aliasing features during sampling 14 and filtering of such digital signals. Hence, an anti-aliasing filter implementation is preferably realized in such a construction.

According to the analog sensor implementation depicted in FIG. 4, electronic interface 42 is formed by a plurality of anti-aliasing filters 52 and an analog multiplexer 54 configured to selectively receive filtered inputs from sensors 38 of a sensing device carried over a field of interest. An analog to digital converter 55 converts detected analog signals into computer recognizable digital signals. In operation, analog multiplexer 54 selects one of the "n" input signals from a sensor 38. Multiplexer 54 then applies the signal to the analog to digital (ADC) converter 55. Converter 55 communicates with micro computer 44 via a pair of control lines 58 and 60. Namely, line 58 is an output from micro computer 44 that instructs converter 55 to begin a conversion. The other line 60 is an input that allows the converter 55 to tell the micro processor 44 when it has completed a conversion, and is ready to receive more data. Essentially, the first consists of a start of conversion signal. The second consists of an end of conversion signal. Hence, multiplexer 54 requires three separate control lines from micro processor 44 in order to select one of the "n" input channels. Therefore, line 56 enables channel selection via activation of multiplexer 54 responsive to commands therefrom.

According to the analog sensor implementation of FIG. 4, anti-aliasing filters 52 operate to eliminate any high frequency noise that ends up being carried along the signal lines from each sensor 38. For example, if a particular type of sensor being used has a useful signal bandwidth of 1.2 kHz, converter 55 should sample each channel of data with a suitable sampling rate. Typically, the sampling rate should be set to twice the useful signal frequency. The removal of any high frequency noise above the desired bandwidth frequency is carried out by selecting a suitable filter 52 to prevent any effects of signal aliasing. For example, suitable filters 52 for the above exemplary bandwidth would consist of low-pass filters having a cut-off frequency of 1.2 kHz, assuming slight attenuation about 1.2 kHz is acceptable. One realizable filter would consist of a Butterworth filter. Even for cases where a fifth or sixth order Butterworth filter is used, such a realized filter is still not ideal. Therefore, a suitable sampling rate should be set, above the Nyquist rate. Selection of a 20% buffer will give a sampling rate of 2.88 kHz. In order for the analog to digital converter 55 to carry out this sampling rate for each channel, converter 55 must be capable of "n"×2.88 kHz, or a conversion time of 3.5 micro seconds. A converter having such capabilities can be readily purchased.

In operation, micro computer 44 receives converted digital signals corresponding to detected analog data from each of sensors 38 shown in FIG. 4. Micro computer 44 also controls operation of multiplexer 54 to direct selection of the sensor being monitored. Micro computer 44 delivers such received information to computer 46. According to the implementation depicted in FIG. 1, power line 24, in combination with suitable transmitting and receiving (or input/output) circuitry, conveys information between computers 44 and 46 (of FIG. 4).

Figure 5:
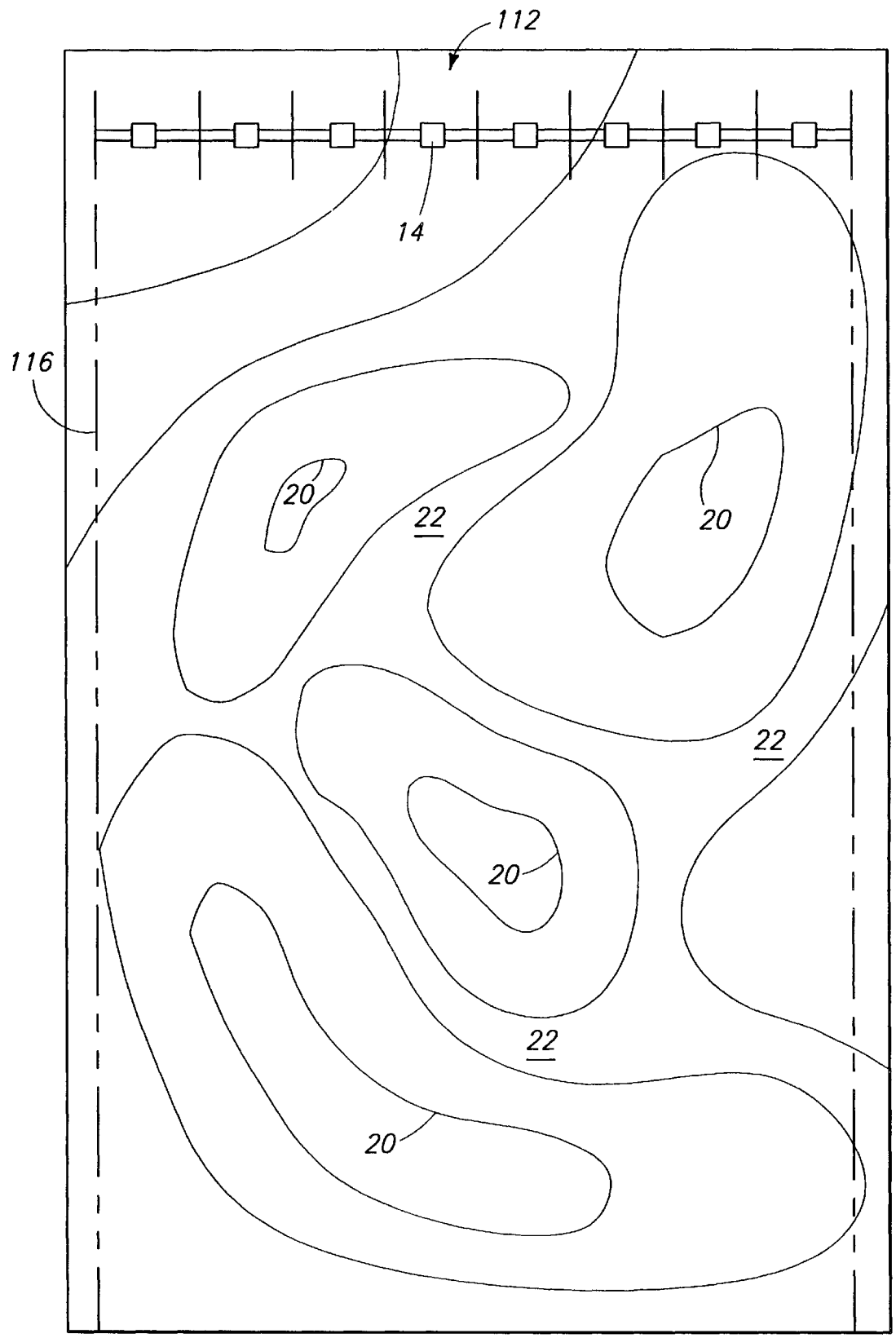
FIG. 5 is a schematic plan view of a second illustrative irrigation device incorporating elements of the remote sensing apparatus depicted in FIGS. 3 and 4.

FIG. 5 depicts a second illustrative and alternatively constructed irrigation device incorporating elements of the remote sensing apparatus depicted in FIGS. 3 and 4. A linear move irrigation device 112 supports a plurality of sensors 14 in a near-ground configuration for detecting agronomic features within a bounded area 116 of a field. Construction of device 112 is similar to construction of device 12 (of FIG. 1). Similarly, hills 20 and valleys 22 are shown in the form of contours displayed across a field. Irrigation device 112 is formed from a plurality of support towers and boom arms connected together according to the construction depicted generally in FIG. 2. However, device 112 is driven in straight line motion, perpendicular to the axis of the device, propelling the device across the field to scan the rectangular-shaped bounded area.

Figure 6:
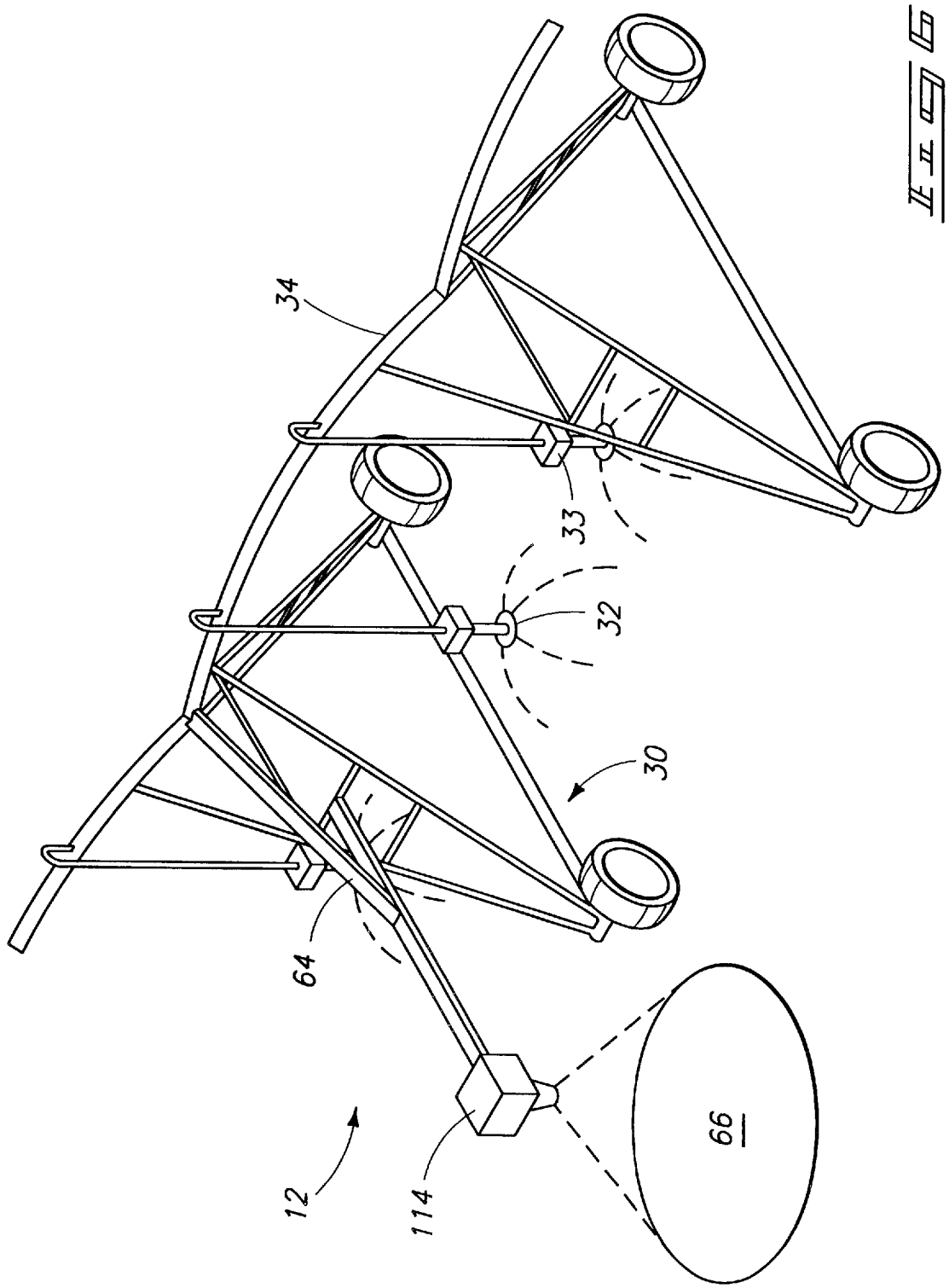
FIG. 6 is an enlarged schematic perspective view of an alternatively constructed remote sensing apparatus carried on the end portion of the irrigation device of FIG. 1.

FIG. 6 illustrates an alternatively constructed horizontal boom arm 64 configured to support a sensing/application device 114 in a near ground configuration with an area of interest 66 being detected/effected. Sensing/application device 114 is constructed according to the disclosure of FIG. 3, with an internal sensor 38 (see FIG. 3). However, a sprinkler (or applicator) and a solenoid are also provided in device 114 in fluid communication with a source of fluid for variable application of a fluid comprising one or more chemicals selected from the group consisting of water, fertilizers, herbicides, pesticides, pheromones or other chemical suitable for cultivating a field to a plurality of topographically distinct and detectable zones within a field of ground. Sensor/applicator 114 is carried forward of device 12 as it moves across a field, enabling sensing of information prior to passage of device 12 there over and/or application of water/chemicals according to sensed needs over topographically distinct and detectable zones within a field of ground. Hence, for cases where moisture content of soil is a desired agronomic feature being detected, sensor/applicator 114 is carried forward of advancing device 12, which prevents inadvertent detection of newly applied water from sprinklers 32. Additionally, a sensor/applicator that directly contacts the soil or crop can be used with this construction.

According to FIG. 7, a tall mast support 164 is provided on device 12 in order to support sensing device 14 at a vertical height suitable to prevent interference of agronomic feature detection with internal sensor 38 (see FIG. 3) due to water or chemicals being sprayed from sprinklers 32. Additionally, the field of view can be increased by elevating sensing device 14. Mast support 164 is rigidly secured to boom arms 34 in order to rigidly support sensing device 14 thereabove. Alternatively, mast support 164 can be formed from two pieces that nest in concentric coaxial alignment. One piece is received in the other piece, enabling telescopic adjustable fixturing of the pieces therebetween, allowing for elevational adjustment of sensing device 14 thereabove. Typically, a fastener is received through both pieces in order to fixture the pieces together therebetween. Further alternatively, mast support 164 can be formed from an articulating robotic arm, enabling articulation of sensing device 14 when it is desirable to scan an area surrounding the adjacent region of the irrigation device 12. Accordingly, sensing device 14 scans an area of interest 136 on a field therebelow.

FIG. 8 illustrates another alternative construction for movably supporting a sensing device 14 along the arm of device 12. Sensing device 14 is movably supported along a support track 264 that is carried by boom members 34 of device 12. Preferably, track 264 is supported along device 12 by vertical masts (not shown) extending upwardly of the towers that support the moving device. Additionally, a servo actuated motor drive 266 is activated/deactivated by a computer or microprocessor to move sensing device 14 along device 12. Preferably, the computer also contains a geographic information system (GIS). Sensing device 14 is supported for axial movement along track 264 by a plurality of roller bearings received about track 264 so as to support sensor 14 in a plane perpendicular to the track, yet enable unrestricted motor driven movement along the direction of track 264. Movement of sensor 14 is caused by activation and deactivation of servo motor drive 266 via computer 44 (of FIGS. 3 and 4). Drive 266 has a gear wheel that is configured to mesh with a linear gear track formed on track 264. Alternatively, a frictionally engaging rubber surfaced wheel, that maintains rolling contact with the track, can be substituted for the gear wheel. By accurately monitoring the rotation of drive 266, the position of sensor 14 can be determined by the computer during operation.

In operation, sensing device 14 of FIG. 8 can be moved laterally of the path of motion of device 12, as it is being carried in close proximity to areas of interest on a field. As was true for the device of FIGS. 1–4, sensing device 14 houses one or more sensors. Sensing device and servo motor drive 266 together form a mobile carrier 238. In one version, the number of sensing devices carried on mobile carrier 238 can be greatly reduced, enabling use of as little as a single sensing device having a single sensor on the mobile carrier. Additionally, or alternatively, provision of lateral movement for sensing device 14 enables more complete scanning of a field by allowing for complete coverage of a field being sensed, even where a small region of interest is detected by the detecting device within sensing device 14.

Sprinklers 32 and solenoid valves 33 can also be movably mounted onto mobile carrier 238 by utilizing track 264 to mount sprinklers movably there atop. For example, the sensing/application device 114 (of FIG. 6) can be carried on track 264 (of FIG. 8). Such a construction, similar to that used to mount sensing device 14, as shown in FIG. 8, would utilize flexible water feed lines to deliver water to sprinklers 32. With such a construction, device 12 could be built with fewer sprinklers 32 such that each sprinkler is moved radially therealong to enable full water coverage of a field during passage of device 12 there over. With this construction, each sprinkler would be mounted onto mobile carrier 238 which travels along track 264 by way of a servo actuated motor drive 266.

Figure 9:
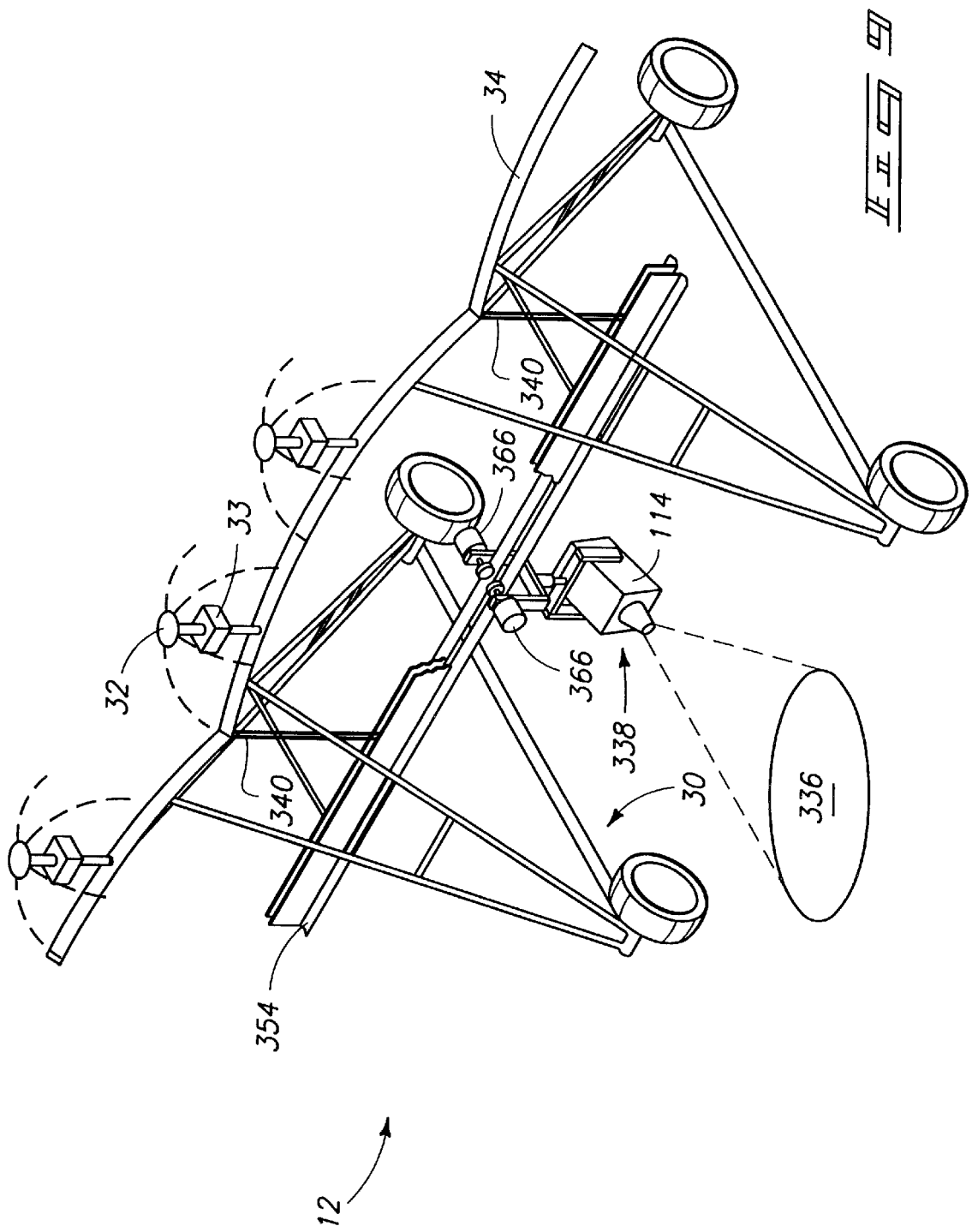
FIG. 9 is an enlarged schematic perspective view of the alternatively constructed remote sensing/applying apparatus movably carried along the irrigation device of FIG. 1.

FIG. 9 illustrates an alternatively constructed sensing/application device 114 similar to the sensing device disclosed in FIG. 8. Sensing/application device 114 is movably carried beneath the longitudinal axis of boom arms 34 on center pivot irrigation device 12. Device 114 is movably carried by a mobile carrier 338 that travels on a pair of support tracks 354 carried by irrigation device 12. Sprinklers 32 and solenoid valves 33 have been mounted to extend upwardly from each boom arm 34 in order to provide an unobstructed longitudinal path for mobile carrier 338. In this manner, mobile carrier 338 can move in a direction perpendicular to the travel direction of irrigation device 12 under its entire length. Mobile carrier 338 supports sensing/application device 114. Alternatively, carrier 338 can support one of a sensing device or an application device. Further alternatively, more than one mobile carrier 338 can be carried on irrigation device 12, each having a sensing and/or application device, either on one common pair of support tracks 354, or on separate pairs of tracks.

According to FIG. 9, support tracks 354 are suspended beneath boom arms 34 from hanger supports 340. A hanger support 340 depends from each pair of adjacent boom arms 34 where they attach together at a support tower 30. In this manner, tracks 354 cooperate to form a mechanical support for hanging mobile carrier 338. Additionally, support tracks 354 are electrified in order to supply operating power to mobile carrier 338. A pair of servo drive motors 366 on carrier 338 move carrier 338 to desired accurate axial positions along irrigation device 12 according to computer implemented control commands that are conveyed as superposed signals atop the electrical power being supplied over tracks 354. Preferably, a computer having a geographic information system (GIS) stores data and initiates control commands. Accordingly, sensing/application device 114 can accurately detect field conditions/apply chemicals within a specific area of interest 336 within a field.

FIG. 10 depicts in enlarged detail the construction of mobile carrier 338. An input/output interface 384 is movably supported in relation to tracks 364 by mobile carrier 338. Interface 384, which forms an end effector of sensing/application device 114, is rotatably supported about two perpendicular axes via servo actuated motor drives 367 and 368. Preferably, interface 384 includes a camera lenses of an optical detection camera and a spray nozzle of a chemical applicator. Drives 367 and 368 enable adjustment of line-of-sight targeting within a field, enabling an accurate determination of the location of area of interest 336 (of FIG. 9) within a field. Additionally, motion of an irrigation device (such as device 12 of FIG. 1) in combination with movement of mobile carrier 338 enables interface 384 to be accurately aligned via a computer with any desired area of interest within a field.

Preferably, a fluid channel is provided along tracks 364 for supplying chemicals to an applicator of device 114. In one version, a retractable and flexible supply hose forms the fluid channel. In another version, a substantially enclosed trench or trough forms the fluid channel, with carrier 338 providing a snorkel for drawing fluid chemicals (including water) from the channel for accurate and precise application to specific areas of interest within a field.

More particularly, mobile carrier 338 supports sensing/application device 114 via a pair of support yokes 380 and 382. Yoke 382 carries motors 366 along an open u-shaped end. An opposite end of yoke 382 is rotatably connected with a similar end of yolk 380 via servo actuated motor drive 368. Drive 368 includes intermeshing gears which rotatably position yokes 380 and 382 with respect to one another in response to computer control commands that are received as superposed signals over electrified tracks 364. Similarly, a servo actuated motor drive 367 rotatably positions device 114 with respect to yoke 380. Drive 367 also receives computer control commands via superposed signals over electrified tracks 364. Preferably, motor drives 366, 367 and 368 are each responsive to a different frequency signal, enabling transmission of distinct control commands for each drive by a control computer by superposing each frequency signal over electrified tracks 364. In this manner, a payload on sensing/applying device 114 on carrier 338 can be rotated with two separate degrees of freedom, with up to 360 degrees of rotation on each axis.

As shown in FIG. 10, a pair of electrical brushes 370 maintain constant electrical contact between components of mobile carrier 338 and tracks 364. A brush 370 is maintained in spring biased contact with each track 364 while carrier 338 moves along tracks 364. Preferably, brush 370 maintains contact with track 364 along a bottom surface, since the bottom surface tends to present a cleaner surface than the top surface because it does not collect dirt, grime, and fertilizer products. Brushes 370 supply power to the motors of servo motor drives 366, 367 and 368, as well as supply superposed control signals for directing operation of each respective motor to enable computer controlled positioning of interface 384 to a desired line-of-sight over a field.

Preferably, wheels 372 support carrier 338 along tracks 364. Preferably, each wheel 372 has an outer contact surface that accurately maintains rolling contact with track 364, preventing slippage that would make tracking of the position of carrier 338 along tracks 364 difficult and inaccurate. In one version, wheels 372 can have a gear face that intermeshes with a linear gear rack on tracks 364. Alternatively, wheels 372 can have a friction coating, with tracks 364 receiving a similar coating. Even further, a separate position determining device, such as a global positioning system (GPS) receiver or any telemetry device can be used to accurately monitor the position of carrier 338 along tracks 364. Another technique would utilize detectable markers being placed along tracks 364, with sensors being carried by carrier 338 to detect position of carrier 338 along tracks 364. For example, an inductive pickup can be used to detect magnetic markers on tracks 364. Alternatively, any of a number of reluctance, optical or linear position detecting devices can be used.

According to FIG. 10, preferably, motor drives 366 each include a 24 Volt DC motor that drives carrier 338 along a pivot irrigation device. Brushes 370 pick up the voltage from electrical tracks 366 to drive wheels 372. Optionally, four wheels can be used to carry carrier 338 along tracks 364 to better stabilize carrier 338. Preferably, separate sections of track 364 are carried by each pivot span making up a pivot irrigation device, with a short piece of track laying over adjacent sections to form a continuous electrically conductive track beneath the entire pivot device. Such provides electrical continuity for brushes 370.

Pursuant to the above described construction of FIGS. 9 and 10, mobile carrier 338 enables movement of input/output interface 384 to align with a desired area of interest within a field due to 360 degree motion along the horizontal and vertical axes, along with movement along tracks 364. A moving irrigation device 12 supporting carrier 338 enables precise transportation and placement over any area of interest on a field being cultivated via computer controlled positioning. Initially, carrier 338 can collect sensor data about the field being cultivated. For example, a camera could be transported along the full length of the irrigation device near the main line pipe (see boom arms 34 of FIG. 9). Tracks 364 can be mounted to carry device 114 above, below or fore/aft of the main line pipe. Communication information from a computer, superposed over supply power on electrified tracks 364, could include motor control information directing interface 384 on where to go, what direction to aim, etc. Additionally, collected data could be transported back to the control computer on the irrigation device via superposed signals on tracks 364, where it is monitored and stored.

Even further, irrigation decisions can be made regarding chemical and/or water application in reliance on the collected data. Hence, interface 384 can be similarly moved to apply needed chemicals to accurate locations within a field. Additionally, lights can be carried on carrier 338 to enable collection of optical data at night. Even further, desired wavelengths of light could be applied which better enable sensing of certain important crop/soil conditions. Yet even further, other variations could include providing radio communications equipment to transfer data/information between devices on carrier 338 and a base computer, or providing weather collecting instruments on carrier 338 for further monitoring soil, crop growing and harvesting conditions.

Various further alternative mobile carriers including tractors, hand held units, planes, and vehicles can be substituted for irrigation device 12 (of FIG. 1), and device 112 of FIG. 5 for supporting one or more sensors and/or applicators over a field. The mobile carrier is configured to carry the sensor in close proximity to an area of interest in order to detect agronomic information from the area of interest as the sensor is passed near the field. For purposes of scope, "near the field" is considered at most 150 feet from the field, and "close proximity to the area of interest" is considered to be at most 1,300 feet.

Figure 11:
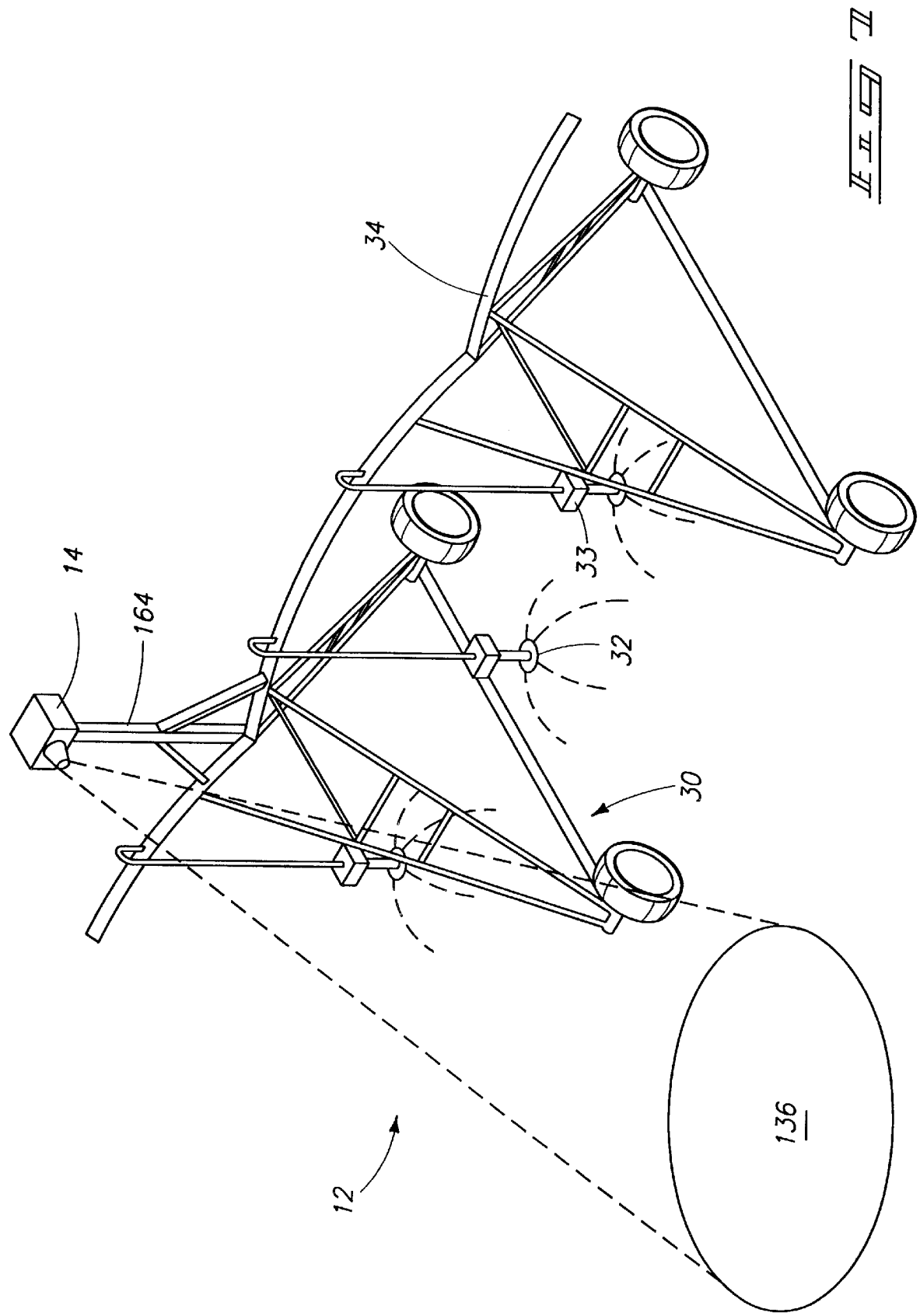
FIG. 11 is a side elevational view of an illustrative tractor and field cultivation device incorporating elements of a remote sensing apparatus of this invention.

FIG. 11 illustrates one alternative mobile carrier in the form of a tractor 70 and a cultivating device 72 being towed across a field there behind. A plurality of mounting arms 74 are carried in spaced apart locations on laterally extending boom arm on cultivating device 72, each arm 74 carry a sensing device 14 similar to that depicted in FIGS. 2–4. Each sensing device contains a sensor configured for collecting agronomic information via a field of view as it scans of area of interest across the field. With such an implementation, a GPS system is also provided in combination with an electronic interface and a computer on board of the tractor 70 to enable tracking of position information for each sensor 14 during collection of data via each sensor 14.

FIG. 12 illustrates another alternative mobile carrier consisting of a truck, or tractor 76 having a storage container (not shown) in which liquid fertilizer or pesticides are carried in liquid form. A pair of laterally extending boom arms 78 mounted to the tractor are each configured with a plurality of sprayers (not shown) from which liquids are sprayed onto a field. A plurality of sensing devices 14 are provided in a laterally spaced-apart arrangement along each boom arm 78, preferably along a leading edge. Sensors in each sensing device 14 thereby scan a field of view so as to collect agronomic information from areas of interest along the field as tractor 76 drives there across. As was the case for the mobile carrier of FIG. 9, a position detecting device such as a GPS system is provided on truck 76 in combination with an electronic interface and computer for storing mapped agronomic information detected from the field. Furthermore, a radio frequency telemetry system can be provided for communicating collected information from the computer on the tractor with a home base computer on which a geographic information system is provided thereon. Likewise, the same can be implemented on the devices of FIGS. 11 and 13.

FIG. 13 illustrates yet another alternative mobile carrier in the form of a crop-duster airplane 80 having a liquid pesticide tank and a plurality of fluid coupled sprayers configured for spraying a field 82. Airplane 80 flies "near-ground" over field 82, while pesticide is sprayed onto crops growing therealong. Typically, airplane 80 will fly between 10 and 150 feet above field 82 while spraying such pesticides or chemicals. A plurality of sensing devices 14 are configured along the wings of airplane 80 such that agronomic information can be detected across field 82 during near-flight of airplane 80 there over. Additionally, a GPS system is provided for determining position of airplane 80 across field 82 in order to map the collected agronomic information with positions on the field. Similarly, an electronic interfacing computer is also provided on airplane 80 for managing collection of such agronomic information being detected via sensors 14. Additionally, or alternatively, a radio frequency transmitting device can be provided for immediately transmitting detected agronomic information to a home base computer system having a geographic information system (GIS) loaded thereon. Alternatively, such detected agronomic information can be stored in memory, after which the information is downloaded to the home base computer system.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for detecting agronomic information on an agriculture field comprising:
   at least one sensor configured to detect agronomic information from an area of interest from within a field, the agronomic information over space and time being useful to facilitate an optimized growing of a crop;
   a mobile carrier configured to carry the sensor in close proximity with the area of interest, the sensor constructed and arranged to detect the agronomic information from the area of interest as it passes near the field; and
   a computer having a central processing unit, a memory coupled to the central processing unit, and an electronic interface coupled between the memory and the sensor for transferring the detected agronomic information into the memory, the computer configured to collect the detected agronomic information from the areas of interest within the field.

2. The apparatus of claim 1 further comprising a control system implemented by a computer for controlling equipment for selective harvesting of crops from the field in response to detected agronomic information.

3. The apparatus of claim 1 further comprising an open-loop control system coupled with the computer and configured to collect agronomic information suitable for determining a course of action to be taken during the cultivation of such agriculture field.

4. The apparatus of claim 1 wherein the open-loop control system is configured to predict a crop yield estimate.

5. The apparatus of claim 1 wherein the open-loop control system is configured to direct fertilizer application during a subsequent growing cycle.

6. The apparatus of claim 1 further comprising a control system implemented by a computer for controlling water and/or chemical application rates to the field to be cultivated in response to detected agronomic information.

7. The apparatus of claim 6 wherein the control system comprises a feedback control system configured to receive the detected agronomic information and to control water and chemical applications via the mobile carrier in response thereto.

8. The apparatus of claim 6 further comprising a crop management system configured in memory and implemented via the computer to allow for monitoring and processing of detected agronomic information.

9. The apparatus of claim 8 wherein the crop management system comprises a computer based information system having a geographic information system.

10. The apparatus of claim 9 wherein the crop management system computer and the mobile carrier computer comprise a single computer.

11. The apparatus of claim 9 wherein the crop management system computer is provided spaced apart form the mobile carrier computer, the mobile carrier computer being provided adjacent the mobile carrier.

12. The apparatus of claim 11 further comprising a power line configured to transmit and receive information signals, the crop management system computer and the mobile carrier computer each being signal connected with the other via the power line in operation, the power line providing a communication coupling between the respective computers there between.

13. The apparatus of claim 1 further comprising a positioning determining device configured to detect location of the area of interest within the field being detected by the sensor.

14. The apparatus of claim 13 wherein the position determining device comprises a global positioning satellite receiver.

15. The apparatus of claim 13 wherein the mobile carrier comprises a center pivot irrigation device and the position determining device comprises a compass carried by the irrigation device to measure rotated position of the device, the radial location of the sensor on the device in combination with the measured rotated position of the device being used to determine position of the area of interest being detected.

16. The apparatus of claim 13 wherein the mobile carrier comprises a center pivot irrigation device and the position determining device comprises a shaft encoder carried by the irrigation device to measure rotated position of the device, the radial location of the sensor on the device in combination with the measured rotated position of the device being used to determine position of the area of interest being detected.

17. The apparatus of claim 13 wherein the mobile carrier comprises a center pivot irrigation device and the position determining device comprises a rotary potentiometer carried by the irrigation device about a stationary end-pivot of the device to measure rotated position of the device, the radial location of the sensor on the device in combination with the measured rotated position of the device being used to determine position of the area of interest being detected.

18. The apparatus of claim 1 wherein the mobile carrier comprises a center pivot irrigation device.

19. The apparatus of claim 18 wherein a plurality of the sensors are carried in radially spaced apart relation on a rotating portion of the irrigation device.

20. The apparatus of claim 1 wherein the sensor comprises an optical detector.

21. The apparatus of claim 1 wherein the sensor comprises an acoustic detector.

22. The apparatus of claim 1 wherein the sensor comprises a moisture detector.

23. The apparatus of claim 1 wherein the sensor comprises a temperature detector.

24. The apparatus of claim 1 wherein the sensor comprises a pressure detector.

25. The apparatus of claim 1 wherein the sensor comprises a chemical composition detector.

26. The apparatus of claim 1 further comprising a filter provided with the sensor, the filter constructed and arranged to filter the information being detected by the sensor so as to accentuation the presence of an agronomic feature therein.

27. The apparatus of claim 1 wherein the electronic interface comprises a multiplexer, a plurality of the sensors being individually selected via the multiplexer for detection and transmission of information to the computer.

28. The apparatus of claim 27 wherein the electronic interface further comprises a filter for signal conditioning the agronomic information.

29. The apparatus of claim 27 further comprising an analog-to-digital filter interposed between the multiplexer and the computer, the filter comprising an anti-aliasing filter operable to condition the detected signal so as to prevent aliasing of the signal in response to analog-to-digital conversion there along.

30. The apparatus of claim 1 wherein the mobile carrier comprises a tractor/cultivating device.

31. The apparatus of claim 1 wherein the mobile carrier comprises a tractor/spraying device.

32. The apparatus of claim 1 wherein the mobile carrier comprises a crop-duster airplane.

33. A apparatus for sensing agronomic information on an agriculture field comprising:
    a sensor configured to detect information desirable to growing crops over space and time;
    a mobile carrier configured to carry the sensor over the field, the mobile carrier constructed and arranged to position the sensor to detect information from an area of interest of the field;
    a control system including an administrative computer having a central processing unit, a memory coupled to the processing unit, and a data transfer apparatus coupled between the memory and the sensor for transferring sensed information into the memory; and
    crop management decisions configured in the memory, with the administrative computer comparing sensed information with the crop management decisions to direct application rates of water and chemicals via the control system and for regulating operation of a variable rate device for cultivating the field in response thereto.

34. An apparatus for detecting agronomic information on an agriculture field, comprising:
    at least one sensor configured to detect agronomic information from an area of interest from within a field, the agronomic information over space and time being useful to facilitate the optimized growing of a crop;
    a mobile carrier configured to carry the sensor in close proximity with the area of interest, the sensor constructed and arranged to detect the agronomic information from the area of interest as it passes near the field;
    a computer having a central processing unit, a memory coupled to the central processing unit, and an electronic interface coupled between the memory and the sensor for transferring the detected agronomic information into the memory, the computer configured to collect the detected agronomic information from the areas of interest within the field; and
    a position determining device coupled with the computer and configured to detect location of the area of interest within the field being detected by the sensor.

35. The apparatus of claim 33 wherein the mobile carrier comprises a tractor/cultivating device.

36. The apparatus of claim 33 wherein the mobile carrier comprises a tractor/spraying device.

37. The apparatus of claim 33 wherein the mobile carrier comprises a crop-duster airplane.

38. An apparatus for collecting information to be used by an irrigation and chemical application device to be passed over a field for applying water and chemicals at a desired rate, the apparatus comprising:
    a sensing device configured to detect agronomic information from an area of interest on the field;
    a mobile carrier constructed and arranged to carry the sensing device for taking measurements from within the field;
    a feedback control system configured to receive detected signals from the remote sensing device in order to control water and chemical application rates, the control system allowing for monitoring and data reduction via an information system.

39. The apparatus of claim 38 wherein the feedback control system comprises a computer having a central processing unit, a memory coupled to the central processing unit, and an electronic interface coupled between the memory and the sensor for transferring sensed information into the memory.

40. The apparatus of claim 38 further comprising a geographic information system (GIS) configured to enable crop management decisions, the crop management decisions operable to direct appropriate water and chemical application rates by way of a variable rate agriculture control device resident therein.

41. An apparatus for permitting sensing of an agricultural field, the apparatus comprising:
    a mobile carrier movably carried in relation to a field;
    a sensor supported on the mobile carrier and configurable for movement to sense areas of interest on the field;
    a computer having a central processing unit and a memory coupled to the processing unit; and
    an electronic interface connecting the sensor and the computer, the electronic interface coupled between the memory and the sensor for transferring sensed information into the memory.

42. The apparatus of claim 41 further comprising a communications link coupled with the computer for enabling communications via the link with remote locations from the apparatus to enable data collection and remote control of the apparatus.

43. The apparatus of claim 42 wherein the communications link enables the apparatus to receive outside requests to direct the sensor to sense the specific area of interest on the field.

44. The apparatus of claim 41 further comprising a control system provided at least in part by the computer and a feed-back control loop, the control system configured to control water and chemical application rates by way of a crop management system to allow for continuous monitoring and data reduction to generate field maps for real-time control.

45. A remote sensing apparatus for sensing an agricultural field to be cultivated, comprising:

a sensor configured to detect information desirable to growing crops over space and time;

a mobile carrier for carrying the sensor over the field, the mobile carrier constructed and arranged to position the sensor to detect information from a desired location at a selected time;

a control system including an administrative computer having a central processing unit, a memory coupled to the processing unit, and a data transfer apparatus coupled between the memory and the sensor for transferring sensed information into the memory; and crop management decisions configured in the memory, with the administrative computer comparing sensed information with the crop management decisions to direct application rates of water and chemicals via a closed-loop control and a variable rate agriculture control device.

46. An apparatus for permitting remote sensing of an agricultural field to be cultivated, the apparatus comprising:

a mobile carrier carried over a field to be cultivated;

a sensor supported on the mobile carrier and configurable to sense areas of interest on the field;

a computer having a central processing unit and a memory coupled to the processing unit; and an electronic interface configured to connect the sensor and the computer, the electronic interface coupled between the memory and the sensor for transferring sensed information into the memory.

47. The apparatus of claim 46 further comprising a control system provided at least in part by the computer and a feed-back control loop, the control system configured to control water and chemical application rates by way of a crop management system to allow for continuous monitoring and a data reduction to generate field maps for real-time control.

48. An apparatus for facilitating cultivation of an agriculture field, comprising:

an interface device configured to interact with selected areas of interest within an agriculture field, the interaction over space and time being useful to facilitate an optimized growing of a crop;

a mobile carrier configured to carry the interface device in proximity with the area of interest;

a computer having a processor, a memory coupled with the processor, and a data interface coupled between the processor and the interface device for enabling communication between the processor and the interface device, the processor configured to control interaction of the interface device with selected areas of interest within the field.

49. The apparatus of claim 48 wherein the interface device comprises an effector.

50. The apparatus of claim 49 wherein the effector comprises an application device having an applicator for precisely applying chemicals to the selected areas of interest.

51. The apparatus of claim 48 wherein the interface device comprises a detector.

52. The apparatus of claim 51 wherein the detector comprises a sensing device having a sensor configured to detect agronomic information from the selected areas of interest.

* * * * *

UNITED STATES PATENT AND TRADEMARK OFFICE
CERTIFICATE OF CORRECTION

PATENT NO.    : 5,884,224

DATED         : March 16, 1999

INVENTOR(S)   : Gerald J. McNabb and Byron Smith

It is certified that error appears in the above-identified patent and that said Letters Patent is hereby corrected as shown below:

Col. 2, line 22, delete "are operable", and insert --is operable--.

Col. 4, line 5, delete "dependant", and insert --dependent--.

Col. 4, line 65, delete "view of the", and insert --view of a fourth--.

Col. 8, line 19, delete "being provide", and insert --being provided--.

Col. 8, line 22, delete "being delivered", and insert --the information is delivered--.

Col. 9, lines 26-27, delete "outside work", and insert --outside world--.

Col. 9, line 65, delete "base 20", and insert --base 28--.

Col. 12, line 42, delete "operate is a", and insert --operate a--.

UNITED STATES PATENT AND TRADEMARK OFFICE
CERTIFICATE OF CORRECTION

PATENT NO. : 5,884,224

DATED : March 16, 1999

INVENTOR(S) : Gerald J. McNabb and Byron Smith

It is certified that error appears in the above-identified patent and that said Letters Patent is hereby corrected as shown below:

Col. 13, line 8, delete "are depicted", and insert --is depicted--.

Col. 13, line 30, after "sampling", delete "14".

Col. 15, line 42, delete "Sensing device and", and insert --Sensing device 14 and--.

Col. 16, line 41, delete "a camera lenses", and insert --a camera lens--.

Col. 16, line 63, delete "yolk 380", and insert --yoke 380--.

Col. 18, line 36, delete "are carried", and insert --is carried--.

Col. 18, line 37, delete "arm 74 carry a", and insert --arm 74 carrying a--.

Col. 18, line 40, delete "scans of area", and insert --scans an area--.

UNITED STATES PATENT AND TRADEMARK OFFICE
CERTIFICATE OF CORRECTION

PATENT NO. : 5,884,224

DATED : March 16, 1999

INVENTOR(S) : Gerald J. McNabb and Byron Smith

It is certified that error appears in the above-identified patent and that said Letters Patent is hereby corrected as shown below:

In the Claims:

Col. 20, lines 30-31, claim 13, delete "positioning", and insert --position--.

Col. 20, line 62, claim 19, delete "are carried", and insert --is carried--.

Col. 21, line 12, claim 26, delete "accentuation", and insert --accentuate--.

Col. 24, line 3, claim 47, "and a data", and insert --and data--.

Signed and Sealed this

Seventh Day of September, 1999

*Attest:*

Q. TODD DICKINSON

*Attesting Officer*   Acting Commissioner of Patents and Trademarks